(12) United States Patent
Mahalingaiah

(10) Patent No.: US 9,467,494 B1
(45) Date of Patent: Oct. 11, 2016

(54) METHOD AND APPARATUS FOR ENABLING MOBILE CLUSTER COMPUTING

(71) Applicant: Rupaka Mahalingaiah, Austin, TX (US)

(72) Inventor: Rupaka Mahalingaiah, Austin, TX (US)

(*) Notice: Subject to any disclaimer, the term of this patent is extended or adjusted under 35 U.S.C. 154(b) by 515 days.

(21) Appl. No.: 13/730,792

(22) Filed: Dec. 28, 2012

Related U.S. Application Data

(60) Provisional application No. 61/581,857, filed on Dec. 30, 2011.

(51) Int. Cl.
   *G06F 15/16* (2006.01)
   *H04L 29/08* (2006.01)
   *H04L 29/06* (2006.01)

(52) U.S. Cl.
   CPC .............. *H04L 67/02* (2013.01); *H04L 29/06* (2013.01); *H04L 29/08072* (2013.01)

(58) Field of Classification Search
   CPC .................. H04L 29/08072; H04L 29/06
   USPC ........................................................ 709/201
   See application file for complete search history.

(56) References Cited

U.S. PATENT DOCUMENTS

| | | | | |
|---|---|---|---|---|
| 2003/0005068 A1* | 1/2003 | Nickel | ................ | G06F 9/5066 709/208 |
| 2007/0291748 A1* | 12/2007 | Ichiki | ........................... | 370/356 |
| 2008/0247310 A1* | 10/2008 | Ruffini et al. | ................ | 370/230 |
| 2008/0320138 A1* | 12/2008 | Wada | ............................ | 709/226 |
| 2011/0060988 A1* | 3/2011 | Mysliwy et al. | ............ | 715/702 |
| 2011/0141790 A1* | 6/2011 | Lim | ................................. | 365/64 |
| 2011/0182216 A1* | 7/2011 | Ono | ......................... | H04L 5/16 370/282 |
| 2012/0151018 A1* | 6/2012 | Bacher et al. | ................ | 709/220 |
| 2012/0203823 A1* | 8/2012 | Manglik | ............... | G06F 9/5072 709/203 |
| 2012/0252462 A1* | 10/2012 | Fahldieck | ..................... | 455/438 |
| 2013/0117307 A1* | 5/2013 | Vishnoi et al. | ............... | 707/770 |
| 2013/0232164 A1* | 9/2013 | Bigney | ................ | G06F 9/5061 707/769 |

OTHER PUBLICATIONS

Marinelli, Hyrax: Cloud Computing on Mobile Devices using Map Reduce, Sep. 2009.*

* cited by examiner

*Primary Examiner* — Chris Parry
*Assistant Examiner* — Weiwei Stiltner
(74) *Attorney, Agent, or Firm* — Steven M. Hoffberg, Esq.; Ostrolenk Faber LLP

(57) ABSTRACT

A mechanism that enables multiple Mobile Devices to operate in clusters is provided. Using the mobile cluster mechanism framework provided in this invention, Mobile Devices can execute compute intensive tasks in the field by sharing the task between various devices. The invention also contemplates various options of implementing the cluster mechanism on Mobile Devices. The invention further contemplates solutions for the roaming of Mobile Devices.

8 Claims, 19 Drawing Sheets

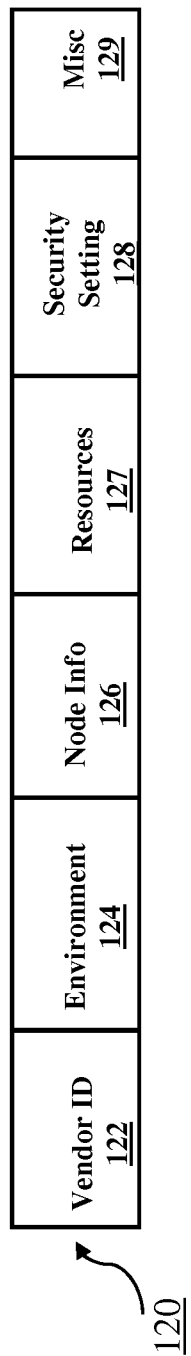
Fig. 4
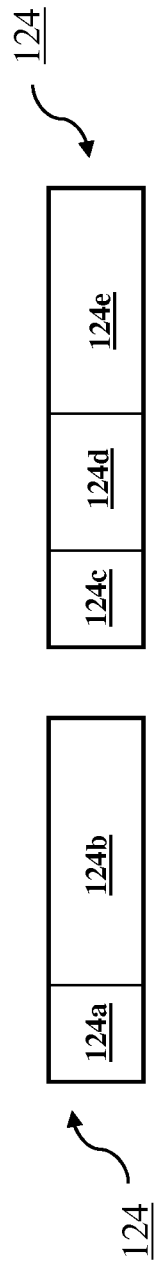
Fig. 5a
Fig. 5b

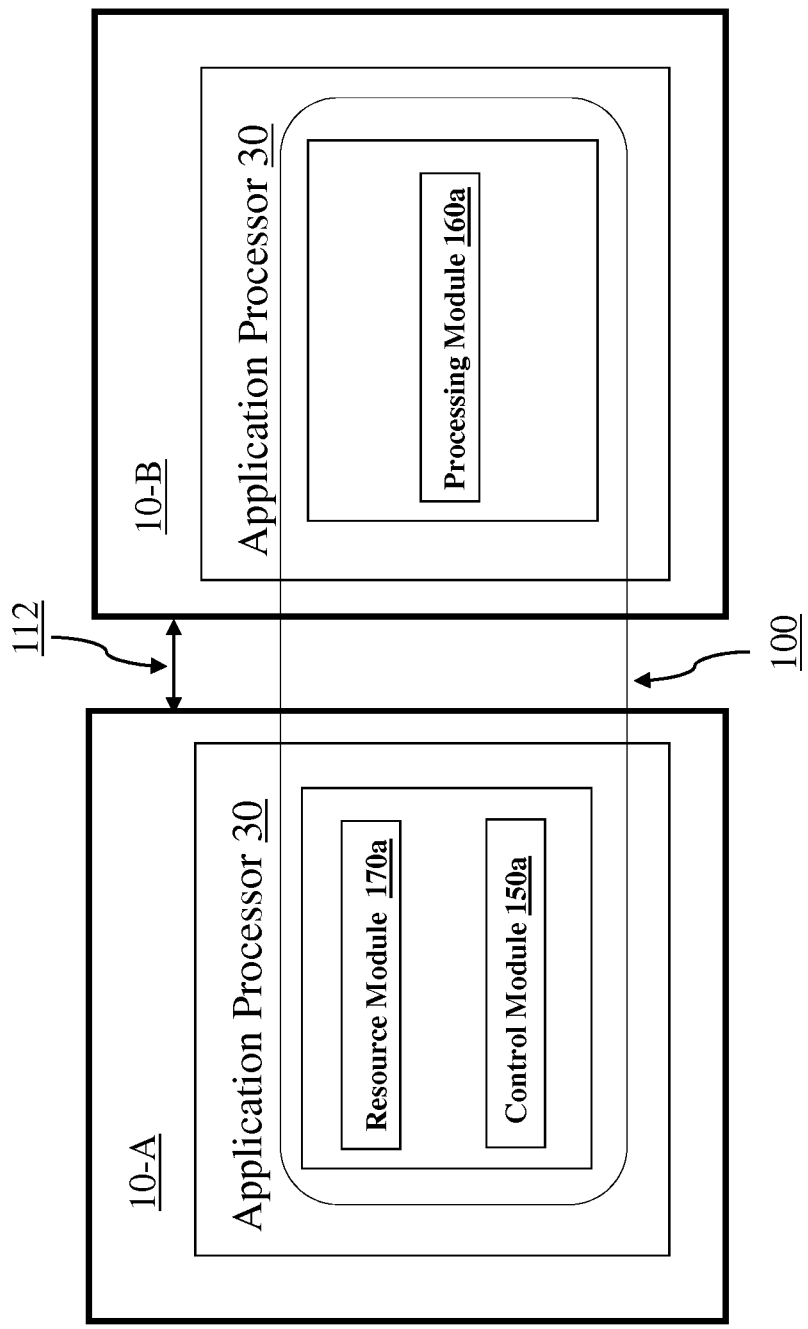

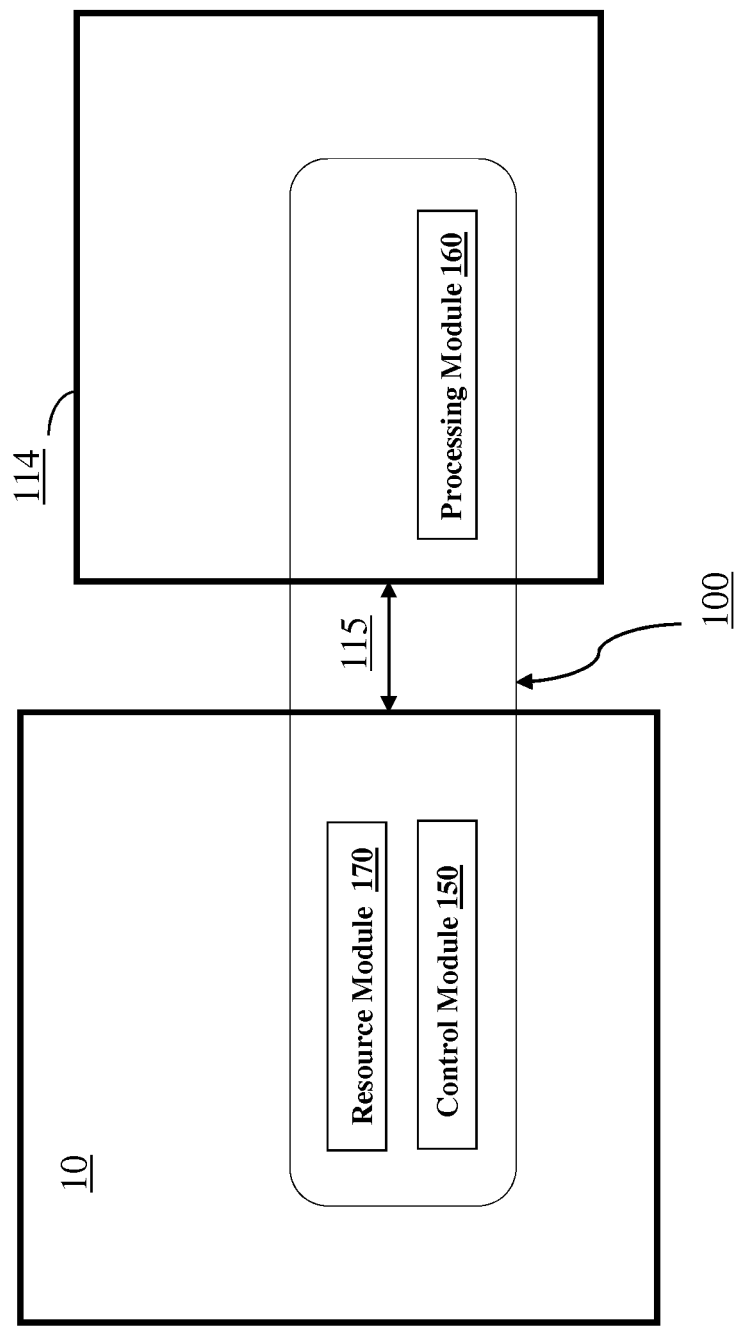

Mobile Device with Add-on with power unit and memory

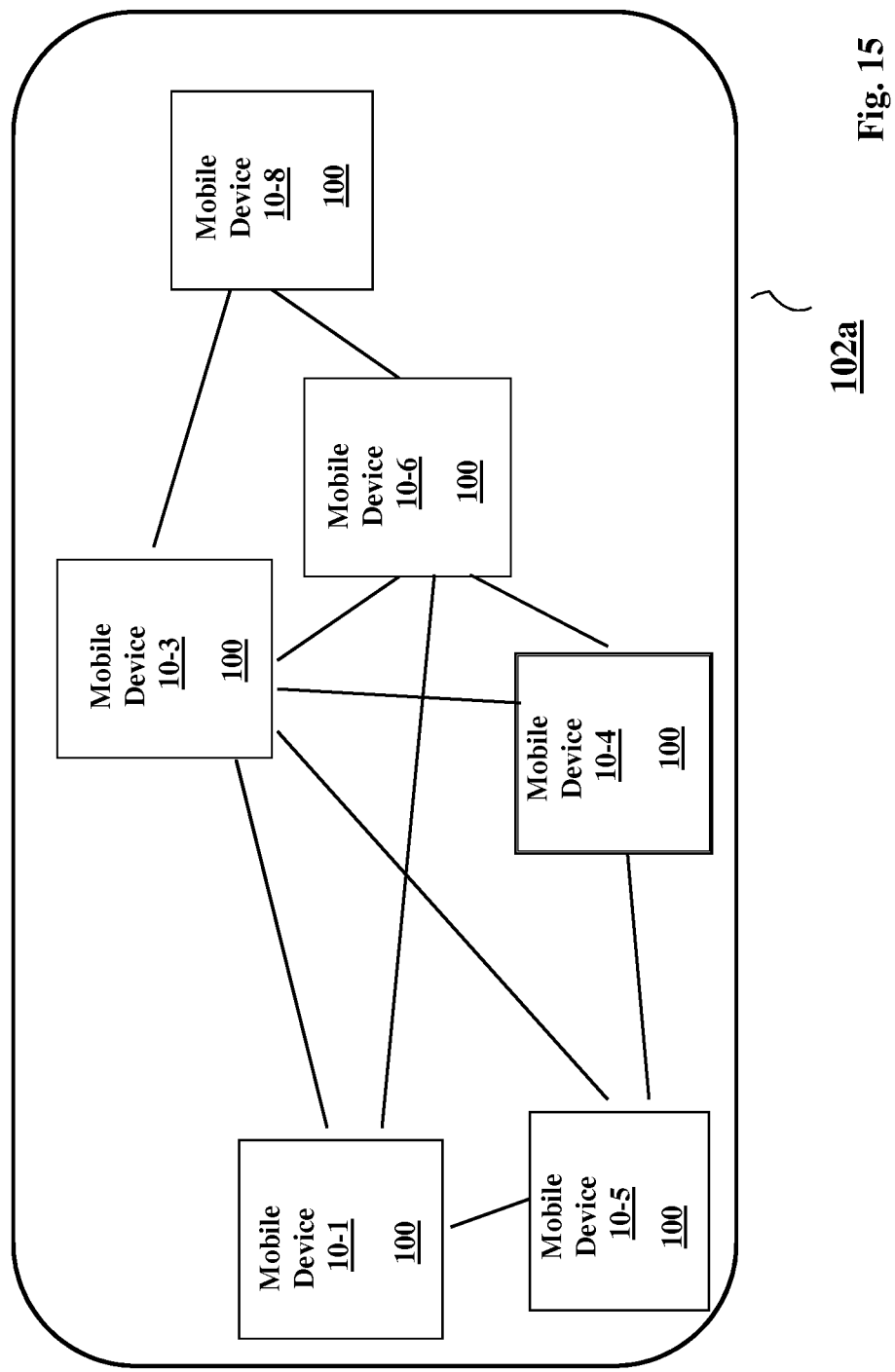

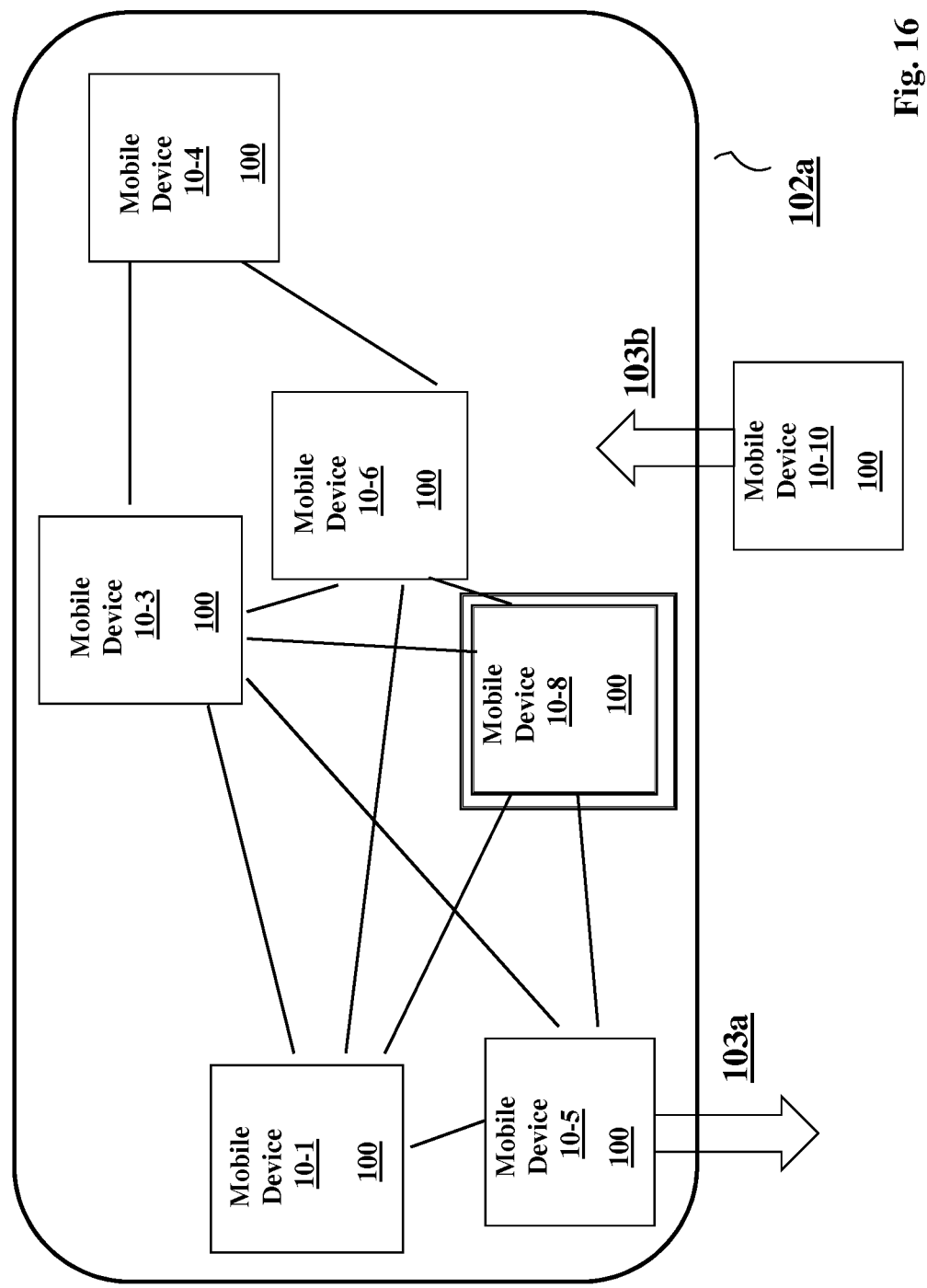

METHOD AND APPARATUS FOR ENABLING MOBILE CLUSTER COMPUTING

PRIORITY CLAIM

The present application is a continuation-in-part of prior U.S. Patent Application No. 61/581,857 filed Dec. 30, 2011.

BACKGROUND OF THE INVENTION

1. Field of the Invention

This invention relates to portable computing devices and, more particularly, to mechanisms and techniques to enable portable computing devices to collectively execute one or more tasks.

2. Brief Description of the Related Art

Electronic digital computational devices like smart phones, tablets, tablet PCs, laptops, netbooks, Personal Digital Assistants (PDAs), handhelds, and other portable computing devices (collectively called 'Mobile Devices') have become a critical part of the life of many individuals and businesses. Advances in these Mobile Devices have enabled significant computing and previously unavailable data communication capabilities. Availability and affordability of these devices is also expanding with their accompanying proliferation.

Mobile Devices have evolved considerably over the past decade and today there is an abundance of small, yet powerful wireless mobile computing devices. Many of these devices have considerable compute power. High-end PDAs and smartphones have powerful computing power along with sensors and Digital Signal Processor (DSP) capabilities. Some of the high-end Mobile Devices even include multiple processors enabling multi-processing capabilities. The future trend is to incorporate more and more powerful multi-core processors into Mobile Devices.

Along with the evolution of the computing power, communication capabilities of the mobile computing devices have also evolved. Today, most high-end mobile computing devices have decent communication capabilities of 20-40 MHz of bandwidth. It is expected that this capability will also continue to grow in the future. Newer technologies like WiMAX are promising to deliver gigahertz of bandwidth for Mobile Devices in the very near future.

The primary intent and purpose of mobile computing devices are to allow users to stay connected, with ability to perform many tasks remotely. Remote tasks include business, financial, personal, and entertainment applications. Mobile Devices of today have succeeded in their primary intent and have even exceeded the expectations of many. This has opened new possibilities beyond serving personal and business needs of individuals.

While individually these Mobile Devices are capable of serving the needs of most users, collectively they present unique computing possibilities. It is possible to use these Mobile Devices collectively to address applications that were traditionally reserved for high-end computers. Enabling Mobile Devices to work together in cluster configurations or parallel processing configurations will enable many new applications for Mobile Devices.

While mobile computing devices cannot match the compute power of supercomputers and traditional clusters of High Performance Computers (HPC), they can provide adequate power to perform some critical operations when operating collectively. In certain applications like real-time monitoring, the proximity of Mobile Devices to the subject will have a distinct advantage over high performance computers located remotely.

Along with the compute power, Mobile Devices need to have adequate communication capabilities to share tasks. Wireless networking has evolved over the past decade and today, Wireless Fidelity (Wi-Fi) has become a popular industry standard. Higher performance and more robust Worldwide Interoperability for Microwave Access (WiMAX) enables gigabits bit rates of wireless communication and is gaining popularity in high end Mobile Devices.

Wireless Local Area Network (WLAN) using Wi-Fi (IEEE standard 802.11) enables 20-40 MHz of bandwidth today while WiMAX (IEEE standard 802.16) offers a bandwidth of 1 GHz. While this does not compare to the multi-gigahertz of bandwidth available in the HPC, it is adequate for carefully architected mobile cluster systems.

Using the Wi-Fi WLAN communication capabilities, industry has developed several mechanisms to network mobile computing devices. Wi-Fi has evolved from the initial version in 1997 at 2.4 GHz frequency to version 'n' in 2009 at 5 GHz frequency and up to 40 MHz bandwidth with a data rate of 150 Mbit/s. More importantly, from a cluster perspective, this version extends the outdoor range to 820 ft (250 m) and supports four Multiple-Input and Multiple-Output (MIMO) streams.

MIMO is the method of utilizing multiple antennas for wireless communications. For wireless networking, MIMO technology appears in Wi-Fi technology, greatly enhancing their capability over the single-antenna counterparts. While MIMO is primarily used by Wi-Fi routers today, it can also be used by mobile computing devices for cluster configuration. MIMO Wi-Fi equipment utilizes the same network protocols and signal ranges that non-MIMO routers do. The MIMO products achieve higher performance by more aggressively transmitting and receiving data over Wi-Fi channels. MIMO signaling technology can increase network bandwidth, range, and reliability at the cost of potential interference with other wireless equipment.

Another technique available in the industry is VirtualWi-Fi. It is a virtualization architecture for WLAN cards that abstracts a single WLAN card to appear as multiple virtual WLAN cards to the user. The user can then configure each virtual card to connect to a different wireless network. VirtualWi-Fi allows a user to simultaneously connect his machine to multiple wireless networks using just one WLAN card. This feature can be used effectively in cluster systems. Virtual channels can be used as dedicated control channels and for dedicated data communication.

While the compute power and communication capabilities of Mobile Devices are adequate for performing compute intensive tasks, mechanisms to connect them effectively to harness the available resources is missing.

Industry has developed several mechanisms to connect multiple Mobile Devices. One technology used to network mobile computing devices is MANET, sometimes called a mobile mesh network. MANET is a self-configuring network of Mobile Devices connected by wireless links. Each device in a MANET is free to move independently in any direction, and will therefore change its links to other devices frequently. Each must forward traffic unrelated to its own use, and therefore, be a router. The primary challenge in building a MANET is equipping each device to continuously maintain the information required to properly route the traffic. Such networks may operate by themselves or may be connected to the larger Internet. MANETs are a kind of wireless ad hoc network that usually have a routable networking environment on top of a Link Layer. They are also a type of mesh network, but many mesh networks are not mobile or not wireless.

MANET may be compared to Local Area Networks (LAN) in desktop computer environment. Like LAN, MANET allows Mobile Devices to share data. While MANETs provides mechanisms for networking Mobile Devices, it is not a cluster mechanism. While it provides loose connectivity for Mobile Devices to communicate, but does not provide a control cluster mechanism to share tasks.

As seen, advances in semiconductor and wireless technology have resulted in powerful mobile computing devices that are compute capable as well as have decent communication capabilities. Often, these Mobile Devices are also equipped with sensors along with the DSP capabilities. While quite powerful as individual devices for personal use, they do not have the necessary capability to address complex real-time computational challenges.

There is a growing need to solve tasks involving information and decision processing in the field, close to where events are actually happening. While individual Mobile Devices cannot perform this task, it is possible to distribute the task between several such devices available in the field. It is possible to take advantage of multiple Mobile Devices present in the location in cluster configuration to perform complex computational tasks.

Despite availability of powerful devices and adequate communication capabilities, there are several barriers preventing Mobile Devices from executing high performance real-time mobile computation by sharing task with other Mobile Devices.

Some of the barriers are:
1. By nature, Mobile Devices are in motion and change their physical locations. This dynamic geographic positioning of the compute units introduces complexities into cluster systems. It poses problems for setting up reliable cluster system in a regular configuration with known neighbors.
2. Availability of any device cannot be guaranteed as devices keep moving in and out of the communication range of a potential cluster system. It poses problems for setting up reliable cluster system when devices are moving in and out of the range.
3. Availability of bandwidth is a limitation due to the limited wireless connectivity in the Mobile Devices. This causes problems for transmitting data and results between various cluster nodes.
4. Power usage is the most critical issue with any Mobile Device. The power constraints in the Mobile Device restrict the amount of computation that can be performed on a Mobile Device. As adding additional resources will increase the use of this precious commodity, it inhibits the addition of additional resources.
5. Most Mobile Devices are area constrained. Adding components to the system could be an issue.
6. Securing the communication between various devices is another issue as wireless communication is inherently insecure. Security mechanism of today, such as encryption, will not work well for Mobile Devices as they require computation demanding power.

Surmounting these barriers is critical to enabling high compute power at the field by utilizing Mobile Devices to share tasks.

It will be advantageous to have a robust mechanism that will enable multiple Mobile Devices to work in tandem to solve computation intense problems. It will be further advantageous for the mechanism to surmount the barriers mentioned above. Preferably, the mechanism should minimize any additional demand on power, bandwidth, and area of the Mobile Devices.

It will be advantageous for the mobile cluster mechanism to be flexible to accommodate various cluster schemes. It will be further advantageous for the mechanism to provide controlled, secure environment to selectively enable qualified Mobile Devices to participate in cluster computations.

SUMMARY OF THE INVENTION

The problems outlined above are in large part solved by a design in accordance with the various embodiments of the invention described here. Embodiments of this invention are adaptable for use in any Mobile Device, computer systems, or other digital designs.

This invention contemplates mechanisms to harness the compute power of several mobile computing devices working towards solving real-time complex problems in the field.

The invention contemplates an innovative cluster framework, Mobile Cluster Mechanism (MCM). MCM provides a framework that enables Mobile Devices to work in conjunction with each other towards solving complex computational problems. Specifically, it enables a controlled environment to securely allocate task amongst selected devices.

MCM may be incorporated in Mobile Devices to enable capabilities to perform real-time computations at the field. MCM enables communication with other similar Mobile Devices in the vicinity to form a cluster environment. A cluster environment is a setup in which two or more devices communicate with each other to execute a given task. MCM also enables dynamic real-time resource allocation. It detects the need for additional computing resources in a Mobile Device based on real-time data analysis. MCM manages the information about other Mobile Devices that are available for computation at a given time. It also provides secure access to these other Mobile Devices when required.

This invention provides various embodiments of MCM that provide mobile cluster framework enabling task sharing among multiple mobile computing devices.

In one embodiment, MCM provides a framework that enables multiple Mobile Devices to work in tandem to solve complex real-time problems.

This invention contemplates various means for implementing MCM. In one embodiment, MCM may be implemented in software. In another embodiment, MCM may be implemented in firmware. In another embodiment, MCM may be implemented in hardware. In yet another embodiment MCM may be implemented as a combination of hardware, software, and/or firmware.

In one embodiment, MCM may be implemented as additional hardware to function alongside mobile computing devices to enhance the computing power of the Mobile Device.

In one embodiment, additional hardware may be a co-processor. In another embodiment, the co-processor may be developed as a chip incorporated into the Mobile Device.

In one embodiment, MCM provides mechanisms to detect and manage resources in a mobile computing device.

In one embodiment, MCM enables the ability for a Mobile Device to dispatch a task to other Mobile Devices.

In one embodiment, MCM enables Mobile Devices to lend their compute power to other Mobile Devices towards executing a given task.

The invention also contemplates on various mechanisms that can be used by Mobile Devices to allocate tasks. In one embodiment, MCM may use the positional information of Mobile Devices to establish cluster configuration. In another embodiment, MCM may use this positional information to allocate tasks.

The invention further contemplates mechanisms to optimize computation environment.

While the preferred embodiments of the invention are primarily beneficial in Mobile Devices, other embodiments of the invention further contemplates using the mechanism for desktop and other computing devices with communication capabilities.

A further understanding of the nature and advantages of the present invention may be realized by reference to the remaining portions of the specification and the drawings.

BRIEF DESCRIPTION OF THE DRAWINGS

So that the manner in which the above recited advantages and features of the present invention, as well as others which will become apparent, are attained and can be understood in detail, a more particular description of the invention summarized above may be had by reference to the embodiment thereof which is illustrated in the appended drawings, which drawings form a part of this specification.

It is to be noted that the appended drawings only illustrate the typical embodiments of the invention and therefore should not to be considered limiting of its scope, for the invention may admit to other equally effective embodiments.

FIG. 4 depicts an embodiment of MCM ID.

FIG. 5a shows an embodiment of the Environment field of MCM ID.

FIG. 5b shows another embodiment of the Environment field of MCM ID.

FIG. 8 shows an embodiment of implementing MCM in two Mobile Devices.

FIG. 9a shows an embodiment of implementing part of MCM in a Mobile Device and the rest in an Add-on device.

FIG. 15 depicts a sample MCM environment.

FIG. 16 shows the roaming of Mobile Devices in MCM.

DETAILED DESCRIPTION OF THE PREFERRED EMBODIMENTS

Figure 1:
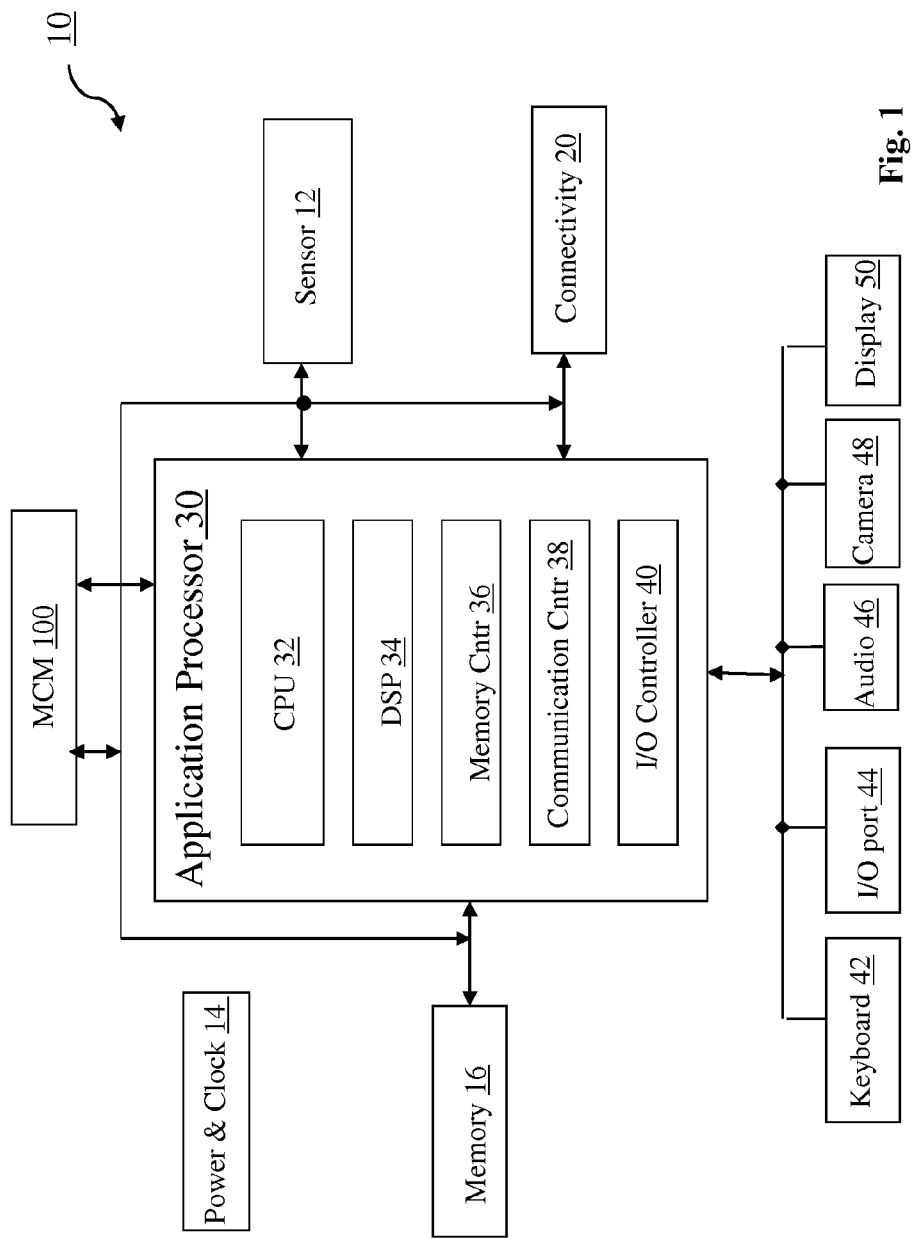
FIG. 1 is a block diagram of one embodiment of a typical Mobile Device configured in accordance with the present invention.

While the invention is susceptible to various modifications and alternative forms, specific embodiments thereof are shown by way of example in the drawing and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

Turning now to FIG. 1, a block diagram of an embodiment of a Mobile Device 10 is shown. A simple embodiment is shown with several functional units to assist in the description of the present invention. The invention applies equally well to all embodiments of Mobile Devices. It should be noted that while a portable device is shown as an example in the description of the invention, embodiments of the present invention applies to any computing devices such as handheld devices, mounted devices, computers, networking devices, and cell phones.

As shown in FIG. 1, Mobile Device 10 may include several functional units such as an Application Processor 30, a Sensor 12, a Power & Clock Unit 14, a Memory Unit 16, a Connectivity Unit 20, a Keyboard/Touchscreen 42, a I/O port 44, an Audio device 46, a Camera 48, and a Display 50. Application Processor 30 may include functional units such as a CPU 32, a DSP 34, a Memory Controller 36, a Communication Controller 38, and an I/O Controller 20. In accordance with this invention, Mobile Device 10 also includes a Mobile Cluster Mechanism Unit (MCM Unit) 100. Mobile Cluster Mechanism Unit 100 may be coupled to other units of Mobile Device 10 such as Application Processor 30, Memory Unit 16, Sensor 12, and Connectivity Unit 20.

Application Processors 30 is responsible for performing most of the computational operations for Mobile Device 10. CPU 32 is the core of Mobile Device 10. DSP 34 is used in high-performance Mobile Device to provide high quality sound and graphic display. Memory Controller 36 controls the operation of Memory 16. Memory 16 may include of hard drive, SDRAM, DDR, DRAM, Flash RAM, and other forms of magnetic, semiconductor, optic, and/or other forms of memory devices. Communication Controller 38 enables Mobile Device 10 to interface with external world via Connectivity Unit 20. Connectivity Unit 20 enables Mobile Device 10 to communicate via various wired and wireless network media, such as Ethernet, optics, Bluetooth, Global Positioning System (GPS), Global System for Mobile communications (GSM) modem, Wi-Fi, WiMAX, and others.

I/O Controller 40 of the Application Processor 30 enables Mobile Device 10 to connect to various I/O Devices. I/O Device Keyboard/Touchscreen Device 42 allows users to either type or touchscreen the data. I/O Device I/O port 44 allows various I/O devices such as the USB devices to be connected to Mobile Device 10. Audio device 46 provides audio interface to Mobile Device 10 such as microphones, speakers etc. Camera 48 captures pictures for Mobile Device 10. Display 50 allows users to control and interact with the Mobile Device 10.

MCM Unit 100 introduces the capability for Mobile Device 10 to work in tandem with other Mobile Devices 10 equipped with MCM Unit 100. It will also enhance the compute power of Mobile Device 10.

Figure 2:
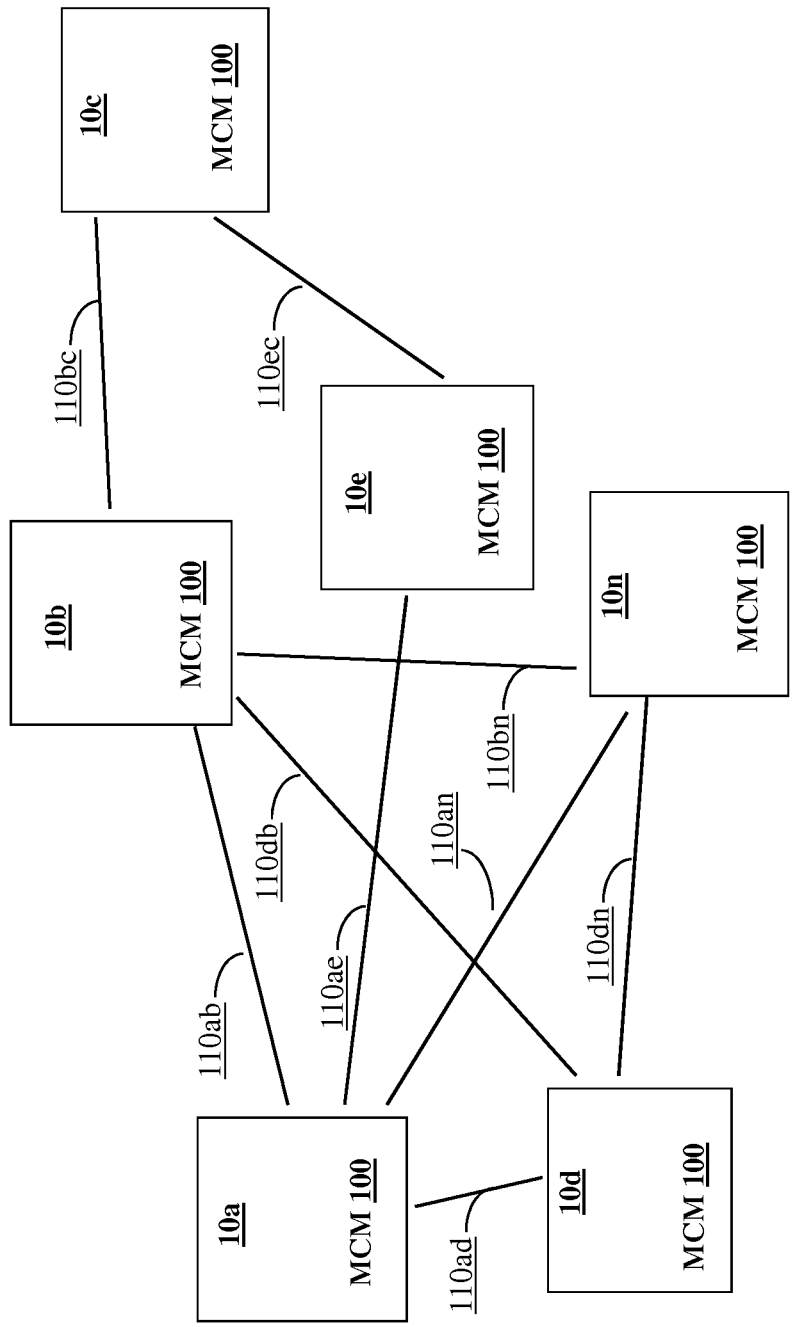
FIG. 2 depicts a simple sample cluster configuration of multiple Mobile Devices in accordance with this invention.

Turning now to FIG. 2, a setup of multiple Mobile Devices 10, designated as Mobile Device 10*a*, Mobile Device 10*b*, Mobile Device 10*c*, Mobile Device 10*d*, Mobile Device 10*e* . . . Mobile Device 10*n* is shown. As shown, each of these Mobile Devices 10 is equipped with MCM Unit 100. MCM Unit 100 of Mobile Device 10*a* allows it to setup a cluster environment with other Mobile Device 10*b*, Mobile Device 10*c*, Mobile Device 10*d*, Mobile Device 10*e*, and Mobile Device 10*n*.

It should be noted that the figure shows a sample deployment. It shows that MCM can be effectively used in random configuration. While the invention contemplates several embodiments, MCM framework is suited equally well to all configurations. In one embodiment, Mobile Devices 10 are configured in complete mesh topology where in each Mobile Device 10 will connect to every other Mobile Device 10 in the field. In another embodiment, they may be configured in torus configuration. In another embodiment, they may be configured in tree configuration. In yet another embodiment, they may be configured in a ring configuration. In another configuration, they may be configured in linear configuration. In yet another embodiment, Mobile Devices 10 may be configured in partial mesh configuration. MCM allows for both random and other configurations used in wired High Performance Computing (HPC) field.

The invention allows for any number of devices to participate in MCM. There is no limitation on the number of Mobile Devices 10 in a given embodiment. In one embodiment, there may be two Mobile Devices 10. In another embodiment, there may be thousands of Mobile Devices 10. The invention applies equally well to any number of Mobile Devices 10.

In FIG. 2, Mobile Devices 10 are shown to connect to other Mobile Devices 10 via a Communication Channel 110. Communication Channel 110 may be any communication scheme, wired or wireless. In one embodiment, Communication Channel 110 is a Wi-Fi connection. In another embodiment, Communication Channel 110 is a WiMAX connection. In another embodiment, Communication Channel 110 represents multiple communication channels. In yet another embodiment, Communication Channel 110 is a radio signal. In another embodiment, Communication Channel 110 is a wired connection such as an Ethernet or a USB. This invention is applicable to all forms communication technology.

In one embodiment, Communication Channel 110 represents unidirectional connections. In another embodiment, Communication Channel 110 represents bidirectional connections.

In one embodiment, each Communication Channel 110 represents one connection. In another embodiment, Communication Channel 110 represents multiple channels of connections. In another embodiment, Communication Channel 110 represents one or more virtual channels of communications.

FIG. 2 shows Mobile Device 10*a* connecting to Mobile Device 10*b* via Communication Channel 110*ab*, Mobile Device 10*a* connecting to Mobile Device 10*e* via Communication Channel 110*ae*, Mobile Device 10*a* connecting to Mobile Device 10*d* via Communication Channel 110*ad*, and Mobile Device 10*a* connecting to Mobile Device 10*n* via Communication Channel 110*an*. Similarly, it shows Mobile Device 10*d* connecting to Mobile Device 10*b* via Communication Channel 110*db* and Mobile Device 10*d* connecting to Mobile Device 10*n* via Communication Channel 110*dn*. Mobile Device 10*b* connects to Mobile Device 10*c* via Communication Channel 110*bc* and Mobile Device 10*b* connects to Mobile Device 10*n* via Communication Channel 110*bn*. Mobile Device 10*e* connects to Mobile Device 10*c* via Communication Channel 110*ec*.

MCM Unit 100 of Mobile Devices 10 establishes and controls the cluster operations. Referring to FIG. 2, when Mobile Device 10*a* wants to setup a cluster environment, MCM Unit 100 of Mobile Device 10*a* will check for other Mobile Devices in the communication range that are equipped with MCM Unit 100. If it finds any, it will establish a cluster environment. FIG. 2 shows a cluster environment with Mobile Device 10*a*, Mobile Device 10*b*, Mobile Device 10*c*, Mobile Device 10*d*, Mobile Device 10*e*, and Mobile Device 10*n*. MCM allows for devices to talk directly to other devices in the environment like Mobile Device 10*a* communicating with Mobile Device 10*b*, Mobile Device 10*d*, Mobile Device 10*e*, and Mobile Device 10*n*. It will allow indirect communication such as Mobile Device 10*a* communicating with Mobile Device 10*c* through Mobile Device 10*b* via 110*ab* and 110*bc*, or through Mobile Device 10*e* via 110*ae* and 110*ec*. Here, Mobile Device 10*b* and Mobile Device 10*e* act as intermediate devices for communication between Mobile Device 10*a* and Mobile Device 10*c*.

In this manner, MCM enables range extension allowing large number of Mobile Devices 10 to form cluster environment for sharing computation tasks.

For a device to participate in MCM, the device should have MCM Unit 100 of FIG. 1. Such a device will be able to execute tasks in conjunction with other Mobile Devices 10 that are equipped with MCM Unit 100.

In addition to being equipped with MCM Unit 100, Mobile Devices 10 must be setup to participate in a given MCM Environment. An MCM Environment is an MCM setup that enables certain MCM enabled devices to work together. Each MCM enabled Mobile Device that can participate in a given MCM environment has to be set up to participate in the given environment.

Figure 3:
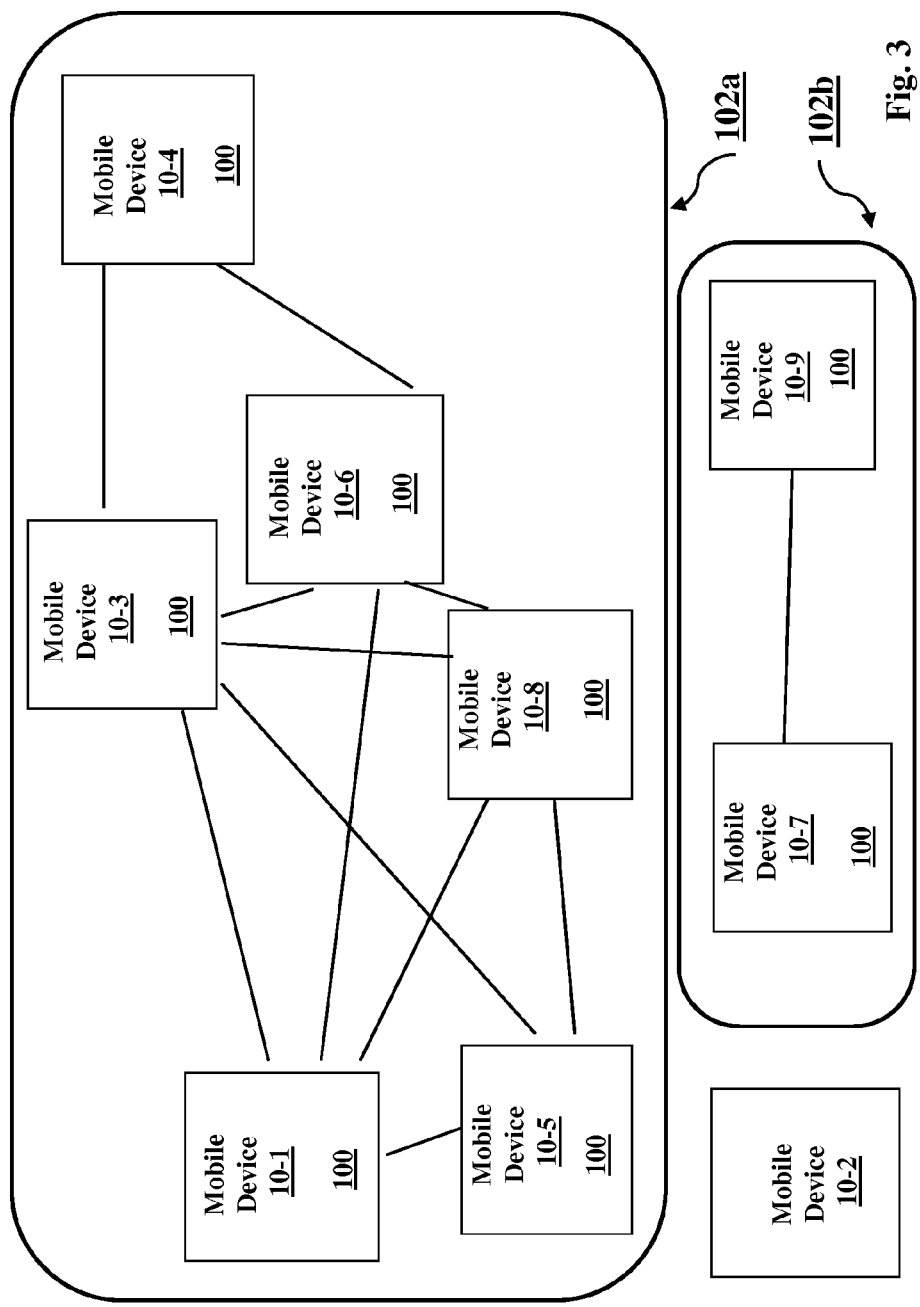
FIG. 3 depicts sample configurations of MCM environment.

Turning now to FIG. 3, a sample working of MCM Environments 102 is shown. Two environments, MCM Environment 102*a* and MCM Environment 102*b* are depicted in the figure. In the figure, nine Mobile Devices 10 are shown. As seen, all Mobile Devices 10, except for Mobile Device 10-2, are equipped with MCM Unit 100. With these MCM Unit 100, Mobile Device 10-1, Mobile Device 10-3, Mobile Device 10-4, Mobile Device 10-5, Mobile Device 10-6, Mobile Device 10-7, Mobile Device 10-8, and Mobile Device 10-9 are eligible to participate in MCM.

Mobile Device 10-1, Mobile Device 10-3, Mobile Device 10-4, Mobile Device 10-5, Mobile Device 10-6, and Mobile Device 10-8 belong to MCM Environment 102*a* and can share tasks among themselves. Mobile Device 10-7 and Mobile Device 10-9 belong to MCM Environment 102*b* and can share tasks between them. Devices belonging to MCM Environment 102*a* cannot share tasks with devices of MCM Environment 102*b* and vice-versa.

In one embodiment, Mobile Device 10 may participate in more than one MCM Environment 102.

In the figure, Mobile Devices 10 are shown to connect to up to four other Mobile Devices 10. Mobile Device 10-1 is connected to Mobile Device 10-3, Mobile Device 10-5, Mobile Device 10-6, and Mobile Device 10-8 directly.

Mobile Device 10-1 connects to Mobile Device 10-4 through Mobile Device 10-3 or Mobile Device 10-6 indirectly. The indirect connection will be dictated by factors such as availability of direct connection channel and proximity.

Mobile Device 10-7 and Mobile Device 10-9 belong to MCM Environment 102*b*. These devices cannot participate in activities of MCM Environment 102*a*.

Mobile Device 10-2 is not equipped with MCM Unit 100. Therefore, it cannot participate in either MCM Environment 102*a* or MCM Environment 102*b*. Mobile Device 10-5 will work with Mobile Device 10-8 and Mobile Device 10-3 even though Mobile Device 10-2 is physically closer to it.

While establishing an MCM Environment, Mobile Device 10 that is establishing the environment checks for the available devices in its range. In one embodiment, if a Mobile Device 10 is be beyond the range of another Mobile Device 10, it can connect indirectly to this Mobile Device 10 via other Mobile Devices. This enables to expand the range of MCM through indirect connectivity.

Indirect connectivity is crucial in a mobile environment as the devices will be in motion, and could leave the area before it has finished executing its assigned task. This dynamic nature of Mobile Devices needs to be taken into account in a mobile cluster system. MCM allows for such 'roaming' situations.

Accounting for the roaming of Mobile Devices is a crucial issue in implementing a stable mobile cluster system. MCM handles this problem with several innovative mechanisms.

In one embodiment, MCM uses indirect connectivity to handle roaming. Referring to FIG. 3, Mobile Device 10-1 could be setting up the MCM Environment 102*a*. At the point of setting up the environment, Mobile Device 10-4 may have been in the direct communication range of Mobile Device 10-1. At some point, Mobile Device 10-4 may have to move to a location where it will not able to communicate with Mobile Device 10-1. In MCM, this situation is handled by indirect communication. Mobile Device 10-4 will communicate with Mobile Device 10-1 via Mobile Device 10-3 and/or Mobile Device 10-6.

In another embodiment, MCM allows for a Mobile Device that needs to move out of the range to sign-off with warning. This allows the task-assigning device to reassign the task to other units. For instance, in FIG. 3, if Mobile Device 10-4 has to move out of the range of communication of all Mobile Devices in MCM Environment 102*a*, it will do so by warning its departure. In one embodiment, this warning is done by periodically ping. In another embodiment, this warning is done by query. In yet another embodiment, this warning is done by pre-notification.

In one embodiment, roaming is handled by Mobile Devices that are about roam out of the range devices pre-warning other devices in the environment about its potential roaming. In one embodiment, this is achieved by border devices broadcasting their exit.

In one embodiment, positional information of the Mobile Devices may be used to manage roaming. In one embodiment, this positional information may be relative position of Mobile Devices 10. In another embodiment, this positional information may be geographic co-ordination. In one embodiment, these geographic co-ordinates may be determined by GPS. In this embodiment, by knowing the GPS co-ordinates of devices in MCM, Mobile Devices 10 in MCM can determine when a device is near the boundary of a MCM range and could potentially move out-of-range.

When scheduling a task, a Mobile Device will consider other Mobile Devices in its environment. MCM allows the devices to check for the workload of a device before assigning new tasks. For instance, Mobile Device 10-1 will check to see if any of its direct connect nodes are available to execute a task. It may realize that Mobile Device 10-8 is busy. It will then pass this device and assign the task to other devices.

In one embodiment, one or more Mobile Devices 10 may be designated as Master devices and other devices may be designated as Slave devices. In this setup, only Master devices can setup a MCM environment. Referring to FIG. 3, Mobile Device 10-1 may be designated as a Master for MCM Environment 102*a*. Mobile Device 10-3, Mobile Device 10-4, Mobile Device 10-5, Mobile Device 10-6, and Mobile Device 10-8 may be designated as Slaves. Only Mobile Device 10-1, as the master, can initiate the setting up of Environment 102*a*. It is responsible for gathering information of other available devices, setting up Environment 102*a*, keeping track of devices in the range, allocating tasks, distributing tasks, managing tasks, and dissolving the environment.

In one embodiment, there may be multiple Masters that share the environment management responsibility. In another embodiment, there may be multiple Masters with one or more designated as Primary Masters and other masters as Secondary Masters. Primary Masters setup and manage the environment. Secondary Masters monitor the environment. Secondary masters may become the active Masters if Primary Master becomes inactive, is not accessible, and/or is overloaded with tasks.

In another embodiment, there can be multiple Primary Masters, each Master being responsible for specific functions of MCM Environment. For instance, one Master may setup and manage devices. Another Master may allocate tasks. Another Master may distribute data and controls.

MCM operation involves initially setting up Mobile Devices 10 to participate in an MCM environment. A key part of this setup is MCM ID. Each Mobile Device with MCM Unit 100 is assigned a unique identifier, MCM ID. Typically, the MCM ID will be part of the MCM Unit 100. Each MCM enabled Mobile Device 10 will have at least one MCM ID associated with it. In one embodiment, Mobile Device 10 will be assigned one MCM ID. In another embodiment, Mobile Device 10 may have more than one MCM ID. For instance, if the device is part of two MCM environments, it may have two identifiers.

Turning now to FIG. 4, an embodiment of an MCM ID 120 is shown. MCM ID 120 is used by MCM in operations such as identifying a device, designating the mode of operation, resource identification, and task allocation. MMD ID 120 comprises of several fields and is flexible to accommodate a wide range of deployments.

A sample MCM ID is shown in FIG. 4 with six fields. It should be noted that many possible implementations of MCM ID 120 are possible. An MCM ID may have one to 'n' fields, where 'n' can be as small as two or a very large number.

The sample embodiment of MCM ID 120 in FIG. 4 consists of a Vendor ID 122, an Environment 124, a Node Info 126, a Resources 127, a Security Setting 128, and a Misc 129 fields.

Vendor ID 122 identifies a specific group, company, unit, or service provider that has the ownership or service of the Mobile Device 10. In one embodiment, the participation of a given Mobile Device 10 in a given MCM environment is restricted to one or more values of Vendor ID 122. In another embodiment, all values of Vendor ID 122 may be allowed to participate in a given MCM environment.

MCM enables a mobile cluster environment for task sharing towards solving complex computational problems in the field. An MCM Environment is a MCM setup that has several MCM enabled devices that can work in together. Environment 124 identifies one or more MCM environments that the Mobile Device 10 is allowed to participate. An MCM environment allows for controlled operation of a given scheme. Each MCM enabled Mobile Device that can participate in a given MCM environment has to be set up to participate in a given environment. In FIG. 4, Environment 124 identifies one or more MCM environment. An MCM environment is dynamically setup for cluster operations.

Turning now to FIG. 5a, an embodiment of Environment 124 is shown. In this embodiment, Environment 124 consists of two fields. The first field is a Number of Environment 124a and next is a Starting Environment 124b. Mobile Device 10 with this Environment 124 can participate in the number specified 124a number of MCM environments. The first MCM environment starts with Starting Environment 124b.

Another embodiment of Environment 124 is shown in FIG. 5b. In this embodiment, Environment 124 consists of three fields—a Key Environment 124c, a Mask 124d, and a Number of Eligible Environment 124e. Based on the Key Environment 124d and Mask 124d, several environments are enabled by Eligible Environment 124e.

Turning back to FIG. 4, Node Info 126 field of MCM ID 120 contains information specific to that Mobile Device 10 participating in a given MCM environment, Resources 127 contains information on the resources available in that specific Mobile Device 10, Security Settings 128 controls the security operations of the Mobile Device 10 in MCM. Misc 129 contains other MCM operation specific information.

In one embodiment, MCM ID may be implemented in software. In another embodiment, MCM ID may be implemented in hardware. In yet another embodiment, MCM ID may be implemented in firmware. In another embodiment, part of the MCM ID may be implemented in hardware, part in software, and/or in firmware.

In one embodiment, MCM ID may be fixed. In another embodiment, MCM ID may be programmable. In yet another embodiment, part of the MCM ID may be fixed and part programmable.

Figure 6:
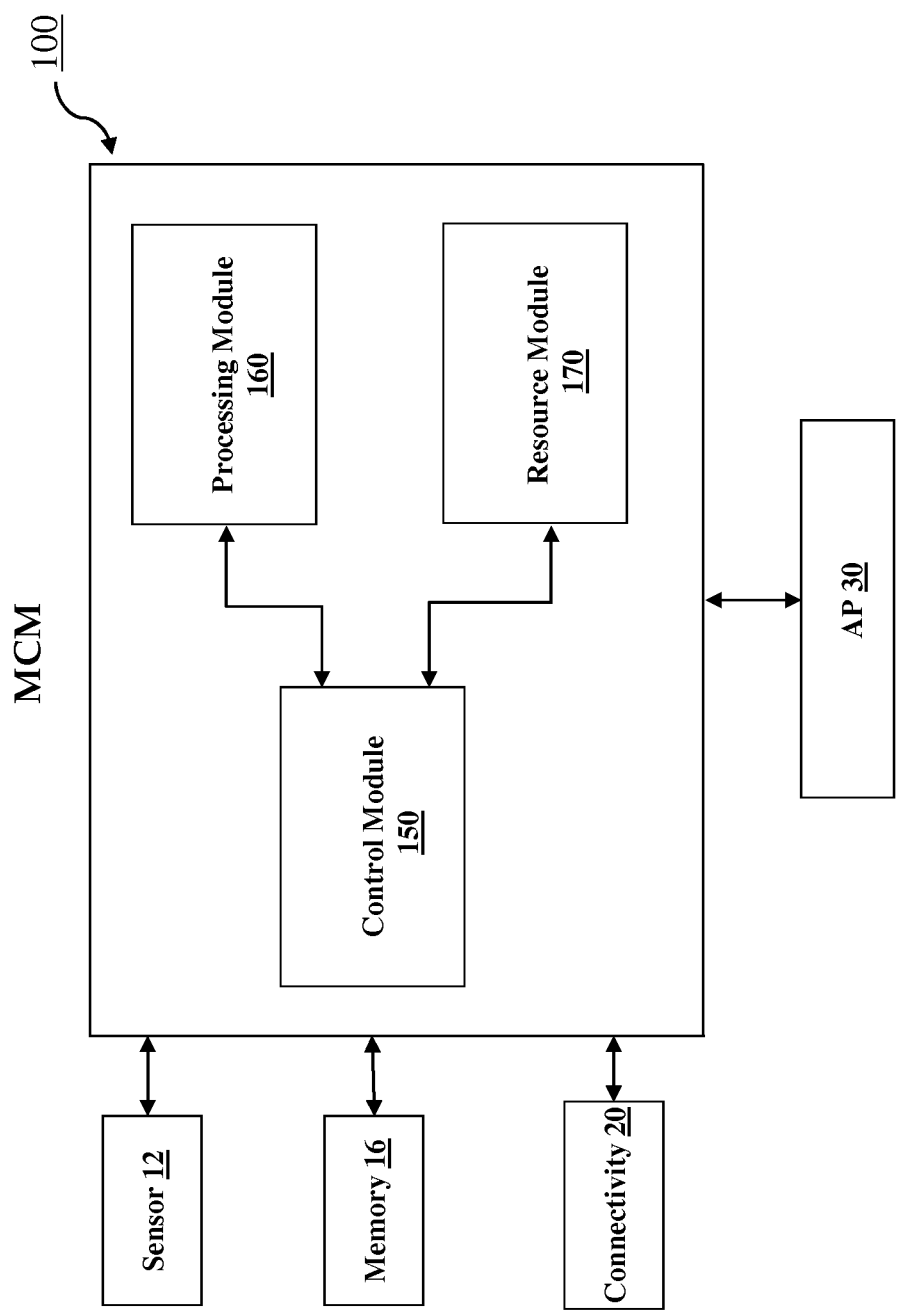
FIG. 6 is a block diagram of one embodiment of implementation of MCM unit.

Turning now to FIG. 6, a sample block diagram of MCM Unit 100 is shown. While there are many possible implementations for MCM Unit 100, FIG. 6 depicts a preferred embodiment for a flexible, modular implementation of MCM Unit. This sample implementation should not be considered as limiting the scope of the invention, but as an embodiment to illustrate the functioning of MCM.

In FIG. 6, MCM Unit 100 is shown to comprise of three modules a Control Module 150, a Processing Module 160, and Resource Module 170. It is shown connecting to Application Processor 30, Sensor 12, Memory 16, and Connectivity 20 (of FIG. 1).

Control Module 150 controls MCM setup, operation, and management functions. It implements communication control, cluster functionality, and management of other MCM modules. This module may be implemented in software running on the Mobile Device. It can also be implemented hardware or firmware.

Processing module 160 executes the tasks assigned to it. It may be implemented in software or hardware in the Mobile Device. It can also be implemented as a plugin module that hosts a co-processor chip and a memory module. It will handle the execution of special algorithms needed to perform intended computations.

Resource Module 170 is responsible for dynamically managing the available devices, recognizing the demand for compute power, distributing tasks to devices, and managing dynamic allocation. This module may be implemented in either hardware or software.

All three of these MCM modules may be implemented in either hardware or software targeting various hardware and software platforms. In one embodiment, software modules may be developed in C/C++ and Java/C++ and hardware modules may be developed as Field Programmable Gate Arrays (FPGAs) or ASICs. Software (including firmware) and hardware implementations include many possible methods of implementations that are in practice in the industry.

The modular architecture of MCM enables a wide range of implementation options. In one embodiment, MCM is implemented in software. In another embodiment, it is implemented in hardware. In another embodiment, it is implemented as a combination of hardware, firmware, and/or software.

In one embodiment, all MCM modules may be implemented within Mobile Device 10. In another embodiment, all MCM modules are implemented as one or more add-on devices. In yet another embodiment, part of MCM is implemented in the Mobile Device and the rest on one in more add-on devices.

To illustrate the wide range of possible implementation of MCM, several embodiments are shown next.

Figure 7A:
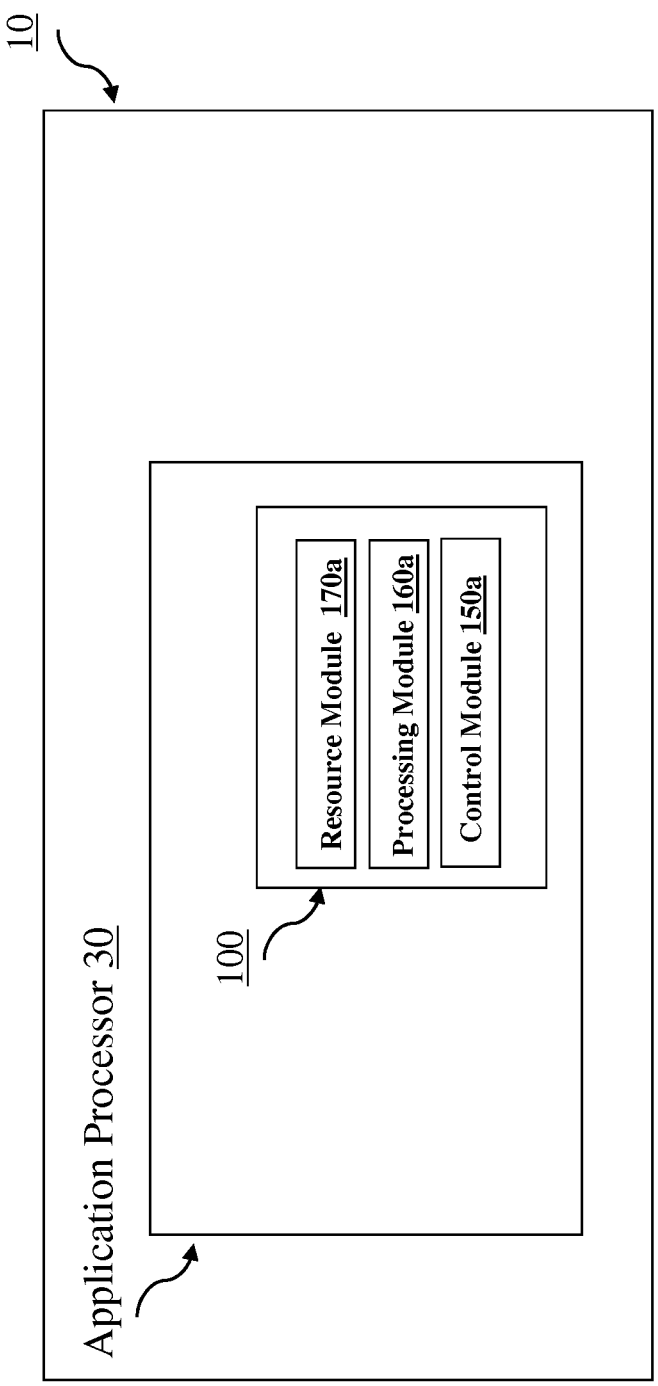
FIG. 7a shows an embodiment of implementing MCM in a Mobile Device as a software module.

Turning now to FIG. 7a, an embodiment of implementation of MCM is shown. In this embodiment, MCM Unit 100 is implemented in software running within Application Processor 30 located in Mobile Device 10. MCM Unit 100 comprises of a software implementation of Control Module 150 shown as a Control Module 150a, a software implementation of Processing Module 160 shown as a Processing Module 160a, and a software implementation of Resource Module 170 shown as a Resource Module 170a.

Figure 7B:
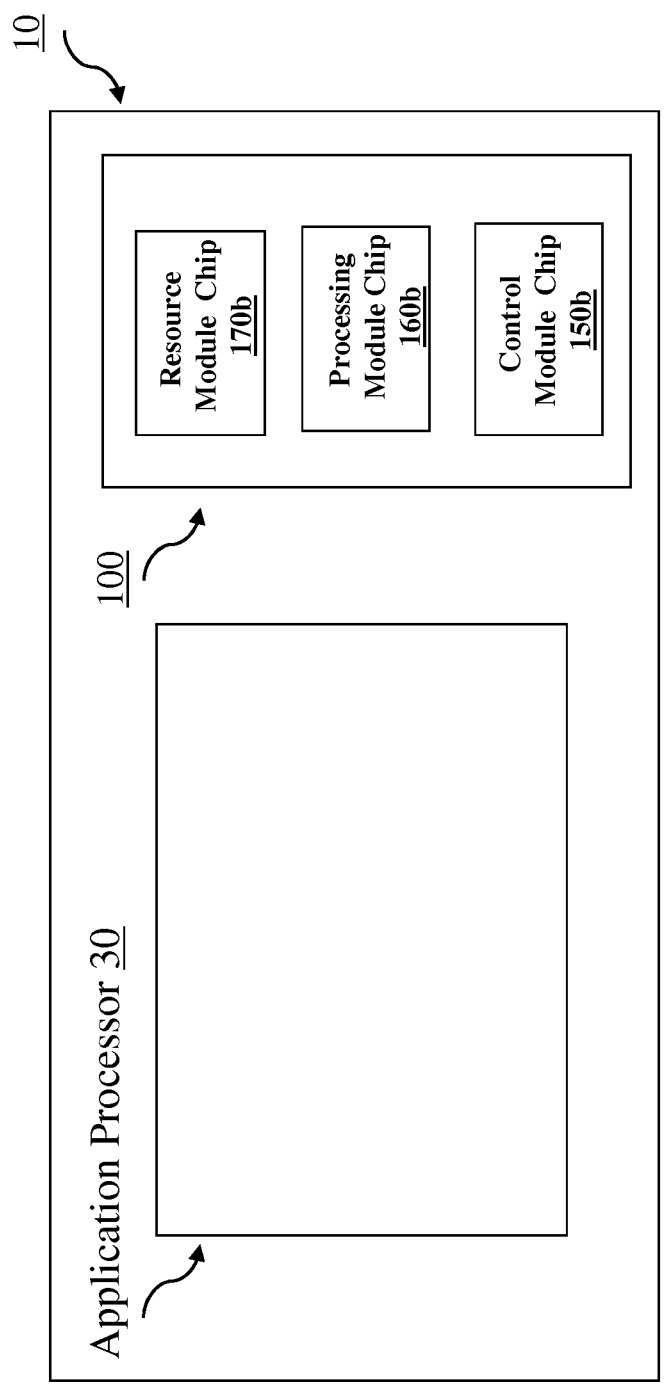
FIG. 7b shows an embodiment of implementing MCM in a Mobile Device as a hardware chip.

Turning next to FIG. 7b, an embodiment of implementing MCM Unit 100 as hardware chips is shown. In this implementation, MCM Unit 100 is shown as one or more chips integrated into Mobile Device 10. MCM Unit 100 comprises of a hardware implementation of Control Module 150 shown as a Control Module 150b, a hardware implementation of Processing Module 160 shown as a Processing Module 160b, and a hardware implementation of Resource Module 170 shown as a Resource Module 170b. In one embodiment, each of these modules is an individual chip. In another embodiment, they are part of the same chip. In another embodiment, they may be combinations of several chips.

Figure 7C:
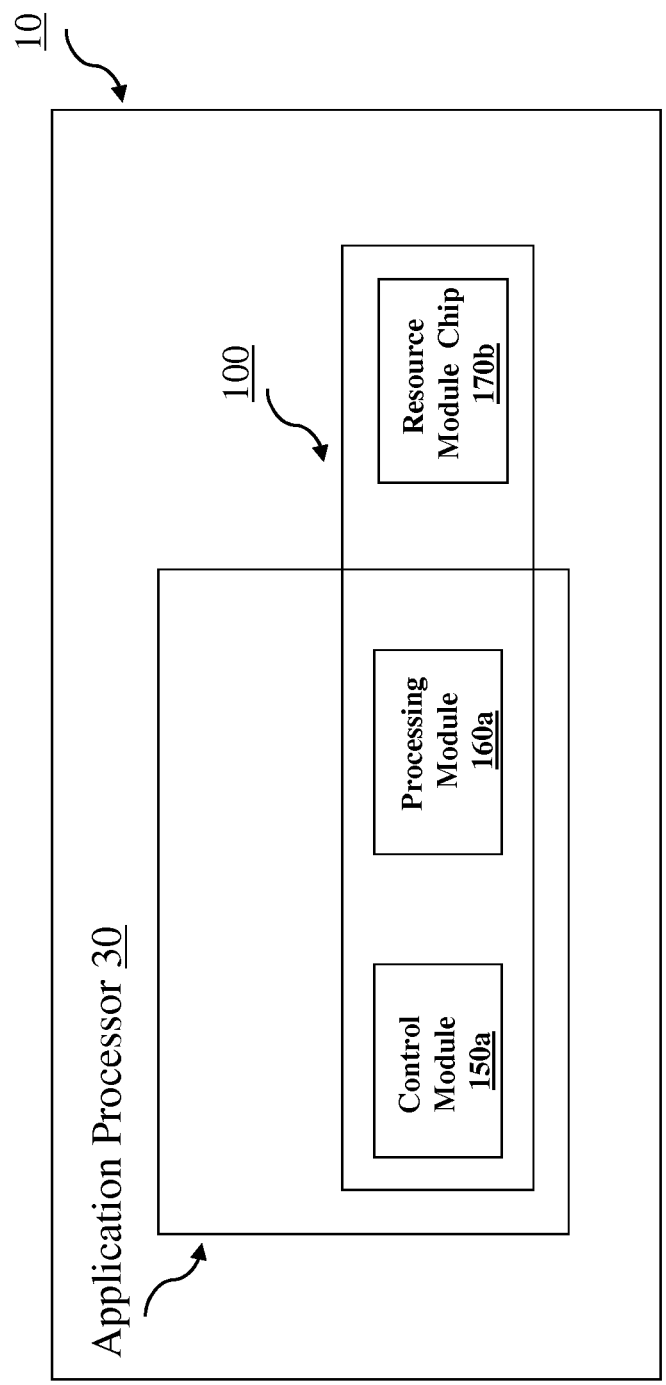
FIG. 7c shows an embodiment of implementing MCM in a Mobile Device as a combination of software and hardware modules.

Turning next to FIG. 7c, an embodiment of implementing MCM Unit 100 as a combination of software and hardware is shown. In this implementation, Resource Module 170 of MCM Unit 100 is shown as an chip integrated into Mobile Device 10. MCM Unit 100 comprises of a software implementation of Control Module 150 shown as a Control Module 150a, a software implementation of Processing Module 160 shown as a Processing Module 160a, and a hardware implementation of Resource Module 170 shown as a Resource Module 170b.

In one embodiment, Control Module 150 is implemented in software as Control Module 150a, while Processing Module 160 and Resource Module 170 are implemented in hardware. In another embodiment, Both Control Module 150 and Resource Module 170 are implemented in software while Processing Module 160 is implemented in hardware.

In another embodiment, part of Control Module 150, Processing Module 160, and/or Resource Module 170 is implemented in software and the rest in hardware.

MCM may be implemented in more than one Mobile Device. For instance, software implementation of MCM Unit 100 of FIG. 7a may not provide adequate performance. Flexibility of MCM allows for various modules or parts of modules to be implemented across multiple Mobile Devices 10.

FIG. 8 shows MCM Unit 100 implement in two Mobile Devices, Mobile Device 10-A and Mobile Device 10-B. In the embodiment shown, Resource Module 170a and Control Module 150a are implemented in Mobile Device 10-A. Processing Module 160a is implemented in Mobile Device 10-B. The two Mobile Devices are connected by a wired or wireless connection, Connect 112.

While FIG. 8 shows one embodiment of implementing MCM Unit 100 across multiple Mobile Devices 10, there are many possibilities. Parts of each module may be implemented in multiple mobiles devices. In one embodiment, Resource Module 170 is implemented in one Mobile Device 10, Control Module 150 on another, and Processing Module 160 on yet another Mobile Device 10. In one embodiment, the modules are implemented in hardware. In another implementation, they are implemented in software. In other embodiments, modules may be implemented in any combination of software and hardware.

MCM may be implemented in special add-on devices that function in conjunction with Mobile Devices.

Turning to FIG. 9a, an Add-on Device 114 is shown connected to Mobile Device 10 via an Add-on Link 115. The figure shows an embodiment of implementing part of MCM Unit 100 in Add-on Device 114. Add-on Link 115 can be a wired link, wireless link, or a connector.

In one embodiment, Add-on Link 115 is a wireless link. It can use Radio Frequency (RF) link, WiFi type of wireless communication link, or special purpose wireless link.

In another embodiment, Add-on Link 115 may be a serial communication link such as an Ethernet, a parallel communication link such as cable, or a special purpose link such as the High-Definition Multimedia Interface (HDMI) link.

In yet another embodiment, Add-on Link 115 may be a connector such as a Universal Serial Bus (USB) port, a docking connector, or a special purpose connector.

As seen, there are numerous possible implementations for Add-on Link 115. Practically any of the industry standard connections and/or special purpose connections can be used for Add-on Link 115.

Figure 9B:
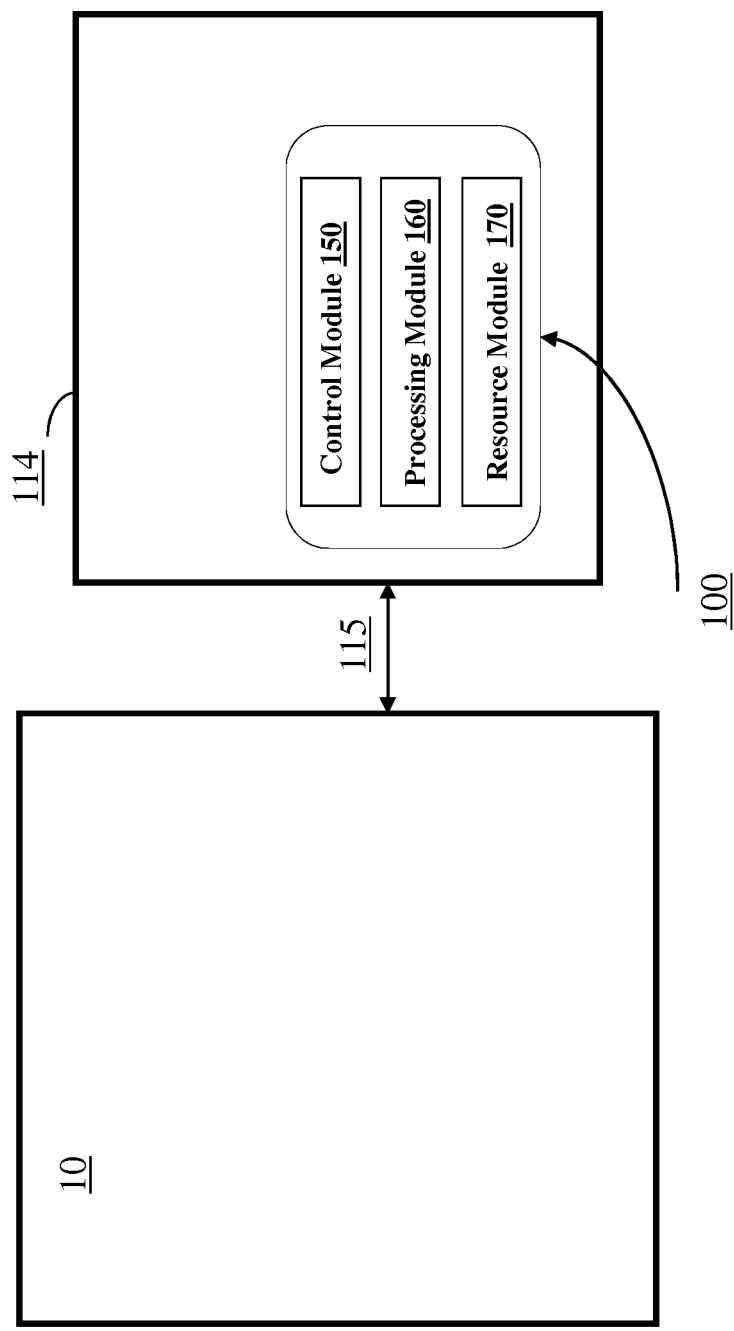
FIG. 9b shows an embodiment of implementing MCM in an Add-on device.

In the embodiment shown in FIG. 9a, Processing Module 160 is implemented in Add-On Device 114 while Control Module 150 and Resource Module 170 are implemented in Mobile Device 10. FIG. 9b shows an embodiment wherein all three modules of MCM, Control Module 150, Processing Module 160, and Resource Module 170 are implemented in Add-on Device 114.

Along with MCM modules, Add-on Device 114 may implement other related components such as memory and power source.

Figure 9C:
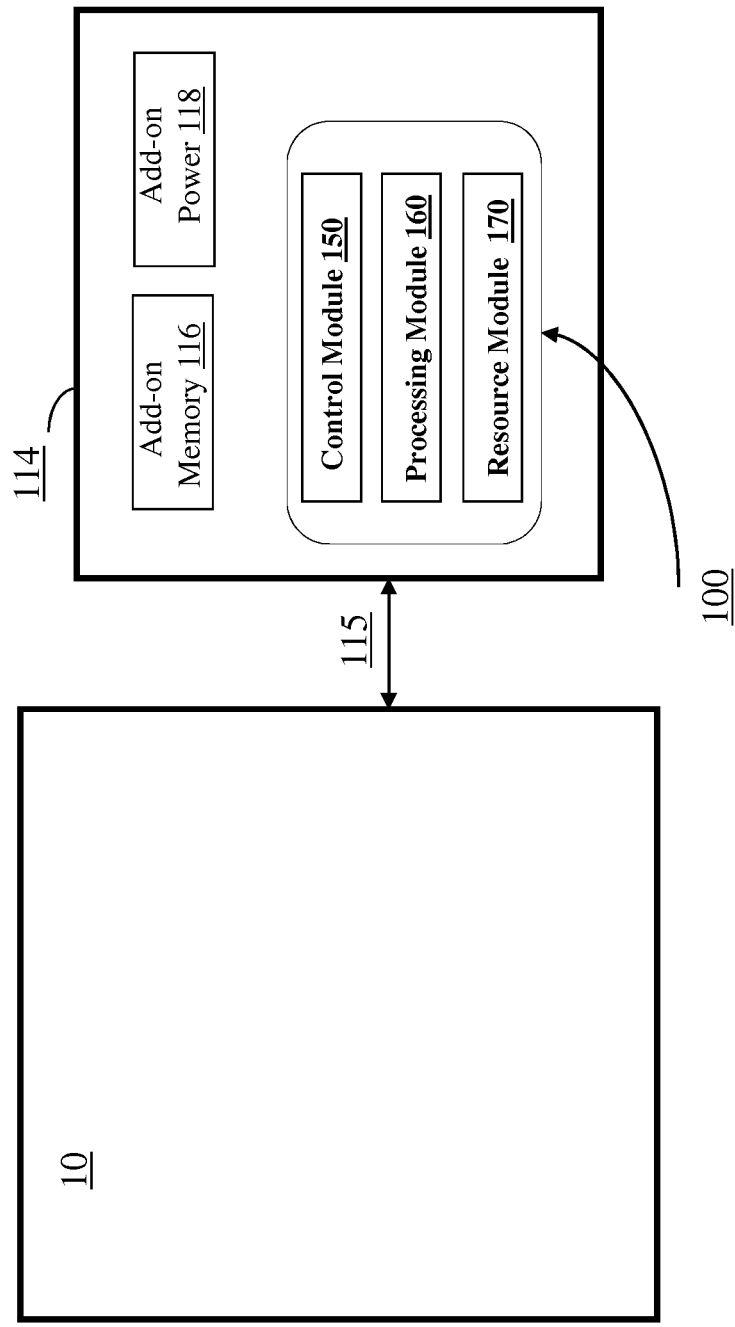
FIG. 9c shows an embodiment of implementing MCM in an Add-on device with other components.

While there are many embodiments possible, FIG. 9c shows an embodiment of Mobile Device 10 with Add-on Device 114. Add-on Device 114 comprises of MCM Unit 100, an Add-on Memory 116, and an Add-on Power Unit 118. In this embodiment, entire MCM Unit 100 resides in the Add-on Device 114. It connects to Mobile Device 10 via Add-on Link 115. In addition to implementing MCM Unit 100, Add-on Device 114 has Add-on Memory 116 and Add-on Power Unit 118.

Add-on Memory 116 consists of memory that may include one or all available memory media such as a hard disk, RAM, DRAM, ROM, EEPROM, Flash, or Optic memory. Typically, Add-on Memory 116 assists in MCM executing special purpose tasks. In one embodiment, Add-on Memory 116 may also assist in the operation of Mobile Device 10. In another embodiment, Add-on Memory 116 may be pre-loaded with data needed for MCM operations.

In one embodiment, Add-on Power Unit 118 is a power supply unit that comprises of power source such as a battery. This battery supplies power to the Add-on Unit 114. Power is a crucial in commodity in Mobile Devices. In some applications, adding additional resource may tax this precious commodity. Add-on Unit 114 with Add-on Power Unit 118 alleviates this crucial problem.

In one embodiment, part of the MCM Unit 100 may reside on Add-on Unit. In another embodiment, Add-on Device 114 may not have Add-on Power Unit 118. In another embodiment, Add-on Device 114 may not have Add-on Memory 116.

Figure 10:
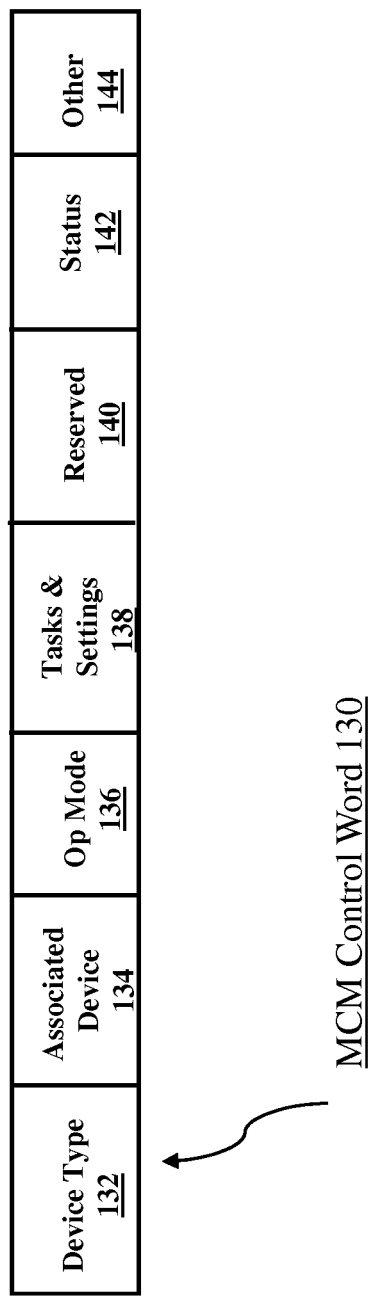
FIG. 10 shows a sample MCM Control Word.

Turning now to FIG. 10, a sample MCM Control Word 130 is shown. MCM Control Word 130 controls the operation of the MCM device within a MCM environment. Along with static information that assists the functioning of MCM, it also has dynamic information for the operation. To illustrate the workings of MCM, sample MCM Control Word 130 is shown in FIG. 10 with seven fields. It should be noted that many possible implementations of MCM Control Word 130 are possible. An MCM Control Word 130 may have one to 'n' fields, where 'n' can be as small as two or a large number.

In FIG. 10, MCM Control Word 130 has a Device Type 132, an Associated Device 134, an Op Mode 136, a Task & Settings 138, a Reserved 140, a Status 142, and an Other 144 fields.

Device Type 132 identifies the functionality of a given MCM Unit 100. The device could have all or some of MCM modules. It may also contain the configuration information of whether the device is set up to function as a Master or Slave in a given environment.

Associated Device 134 identifies which other devices are parts of this MCM Unit. Op Mode 136 defines the modes of operation, and Tasks and Settings 138 controls the execution of a task. Reserved 136 allows for additional functionalities in the future. Status 142 reflects the status of the device and the dynamic status of the execution of the assigned task. Other 144 is used for various operation specific tasks.

Mobile Devices 10 needs to be equipped with MCM Unit 100 to participate in MCM. Setting up MCM ID 120 and MCM Control Word 130, are essential part of the set up process.

Figure 11:
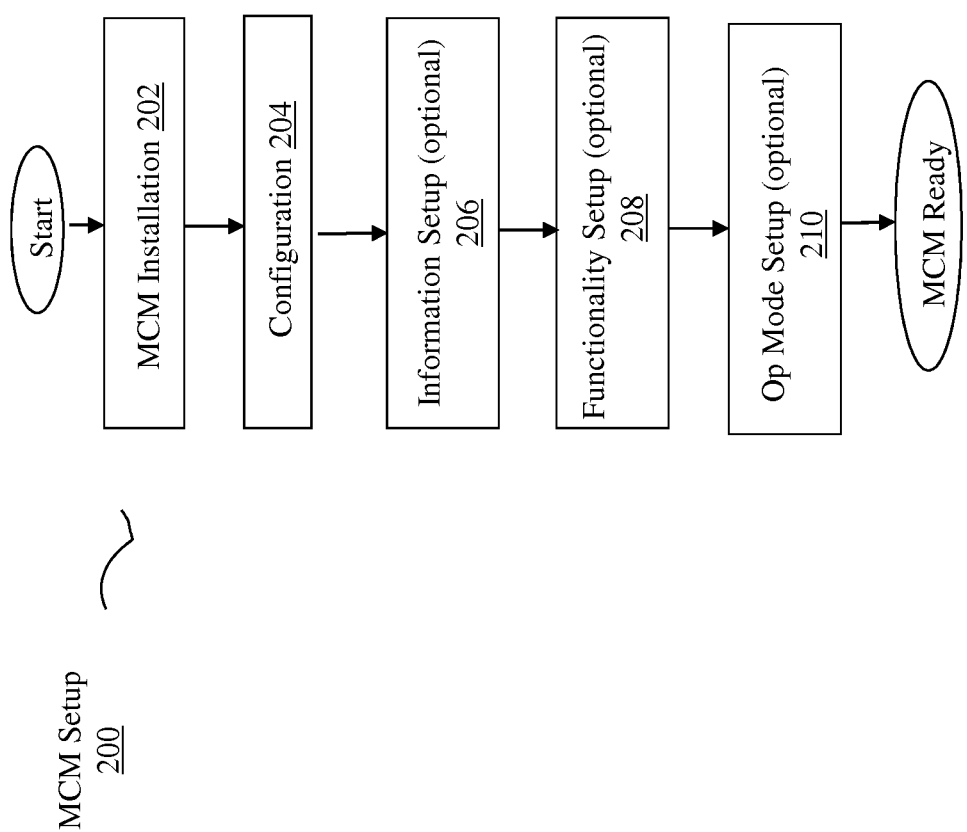
FIG. 11 shows a flowchart for setting up MCM.

Turning now to FIG. 11, a method MCM Setup 200 for setting up Mobile Device 10 to participate in MCM is shown. The method comprises of a MCM Installation 202 and a Configuration 204. It also contains optional processes of an Information Setup 206, a Functional Setup 208, and an Op Mode Setup 210.

MCM Installation 202 includes installing MCM components into Mobile Device 10. This includes both hardware and software components of MCM. In one embodiment, hardware may consist of one or more chips. In another embodiment, it may comprise of Intellectual Property (IP) incorporated into the Application Processor 30. In yet another embodiment, hardware may comprise of a plugin device such as Add-on Device 114. In one embodiment, software component may be installed in the Application Processor 30. In another embodiment, it may be installed into MCM hardware. In yet another embodiment, it may be installed into both Application Processor 30 and MCM hardware.

Following MCM Installation 202, Mobile Device 10 may be configured to run in one or more MCM Environments. Configuration 204 configures Mobile Device 10 to operate in one or more MCM Environments 102. The process of Configuration 204 includes setting up MCM ID 120 and Control Word 130.

Some embodiments may optionally include Information Setup 206. Information Setup 206 may load information required by specific operations of Mobile Device 10. In one embodiment, information is loaded into the Memory 16 of Mobile Device 10. In another embodiment, information is loaded into Add-On Memory 116 of Add-on Device 114.

In one embodiment, information loaded is control or algorithms to execute the operation. In another embodiment, information loaded may be data to be used by the operation. In yet another embodiment, both data and control may be loaded.

In some embodiments, as part of MCM Setup 200, Mobile Device 10 may be set up functionality it needs to execute. This is shown as Functionality Setup 208 in FIG. 11. Functionality Setup 208 includes setting up Mobile Device 10 to function as a Master or Slave in a given MCM Environment 102. In one embodiment, Mobile Device 10 may be set up as Primary Master for one MCM environment and Slave for another MCM environment. In another embodiment, Mobile Device 10 may be set up to participate as Slave in all environments. There are many possible set ups for a given Mobile Device 10.

Optionally, as part of the MCM setup, MCM Device may be set up to operate in various operation modes. Op Mode Setup 210 may set up Mobile Device to start the operation in certain mode. In one embodiment, Op Mode Setup 210 may set up Mobile Device 10 to operate in Secure Mode. In this mode, the device may participate in only specific environments and communicate exclusively with other secure devices.

In another embodiment, Op Mode Setup 210 may set up Mobile Device 10 to operate in Open Mode. In this mode, the device may participate in any MCM environment and communicate with any other devices.

In one embodiment, operating mode of a Mobile Device 10 is dynamic and can change after the initial set up performed by Op Mode Setup 210. In another embodiment, operating mode of a Mobile Device 10 is static and cannot change after the initial set up performed by Op Mode Setup 210.

Following MCM Installation 200, Mobile Device 10 will be ready to participate in MCM.

Multiple MCM devices may work in tandem to solve real-time computation problems in the field. To execute a particular task, they need to be set up in the field. Due to the dynamic nature of Mobile Devices, availability of a given device is not guaranteed. MCM considers this and enables the set up and operation of a dynamic environment.

MCM devices that have gone through MCM Setup 200 are ready to participate in one or more MCM environments. They will be configured with appropriate MCM ID 120 and MCM Control Word 130.

To operate in MCM, a MCM Environment 102 has to be set up. For a given MCM Environment 102, at least one of the devices will be set up as the Master that will initiate a given task. Other devices will be considered as Slaves. For a given task, there could be multiple Masters for redundancy. One of the Masters can be designated as the Primary Master and others as Secondary Masters.

Figure 12:
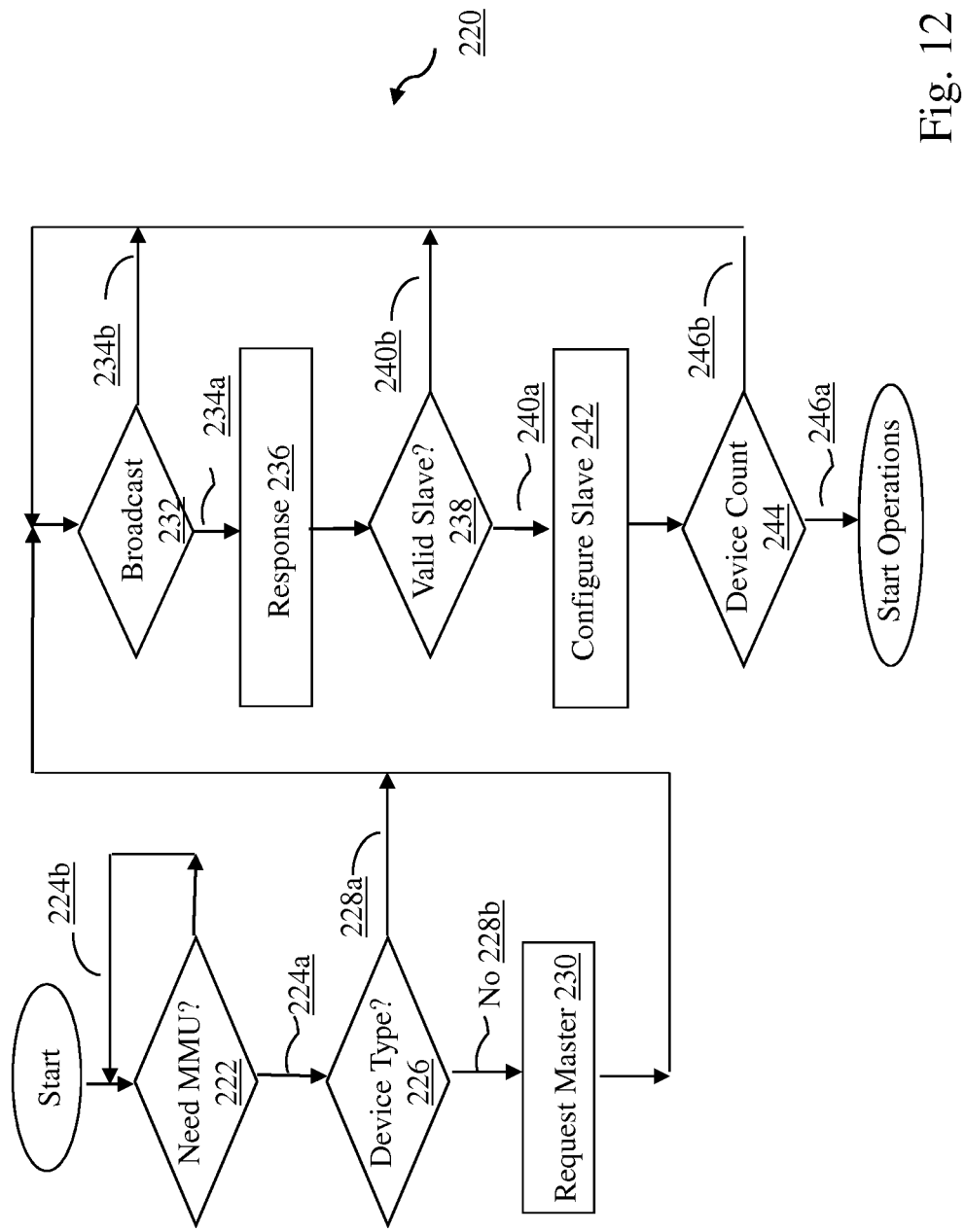
FIG. 12 shows a flowchart for a sample method to setting up MCM environment.

Turning now to FIG. 12, a method to set up a MCM environment is shown. The figure shows an embodiment of MCM Environment Setup 220 comprising of a Need MMU check 222, a Device Type check 226, a Request Master 230, a Broadcast 232, a Response 236, a Valid Slave 238, a Configure Slave 242, and a Device Count 244.

A Mobile Device 10 that is set up with MCM may participate in MCM functions. When active, such a device may be set up to recognize the need to share a task. This is shown as Need MMU check 222 in FIG. 12. In one embodiment, the check may start with a button click. In another embodiment, an event may trigger this check. In another embodiment, this may be done periodically. There are many possible ways this check cloud be triggered.

Following a Need MMU check 222, if there is no need as shown by 224b, the device will continue to remain in the state of checking for the need. When a need is detected, a check for the device type is conducted depicted by Device Type check 226. If the device is a Mobile Device 10 designated as Master, it will initiate a Broadcast 232 shown as 228a. If the device is a Mobile Device 10 designated as a Slave, it will look for a Master to initiate the Broadcast as shown by 228b and Request Master 230. Master will then initiate a Broadcast 232.

When Mobile Device 10 designated as a Master initiates Broadcast 232, it will wait for a response. If no other device responds, Mobile Device 10 designated as Master will continue to broadcast as shown by 234b. If any other MCM enabled device receives this broadcast shown by 234a, it will generate Response 236. Broadcasting Mobile Device 10 designated as Master will check the validity of a responding slave. This Valid Slave check 238 includes the checking of MCM ID 120 and MCM Control Word 130. If the Valid Slave check 238 determines that the responding device is not eligible to participate in the task, it will reject the device and go back to broadcasting for valid devices shown as 240b. If the Valid Slave check 238 determines that the device is acceptable, Configure Slave 242 will be initiated via 240a. Following the configuration of the slave, initiating Mobile Device 10 designated as Master will then check if it has sufficient devices to perform the task at hand shown as Device Count check 244. If Mobile Device 10 designated as Master determines that it requires additional devices, it will initiate additional broadcasts shown by 246b.

If the Mobile Device 10 designated as Master determines that it has enough devices to execute the task, it will stop the broadcast and begin to start the operations as shown by 246a.

Once an MCM environment is setup, one or more Mobile Device 10 designated as Masters may control the operation and task execution of the environment. In one embodiment, a Mobile Device 10 designated as Master may designate the operation of task allocation to one or more Salves. In another embodiment, multiple Mobile Devices 10 designated as Masters may share the work of allocating tasks.

Figure 13:
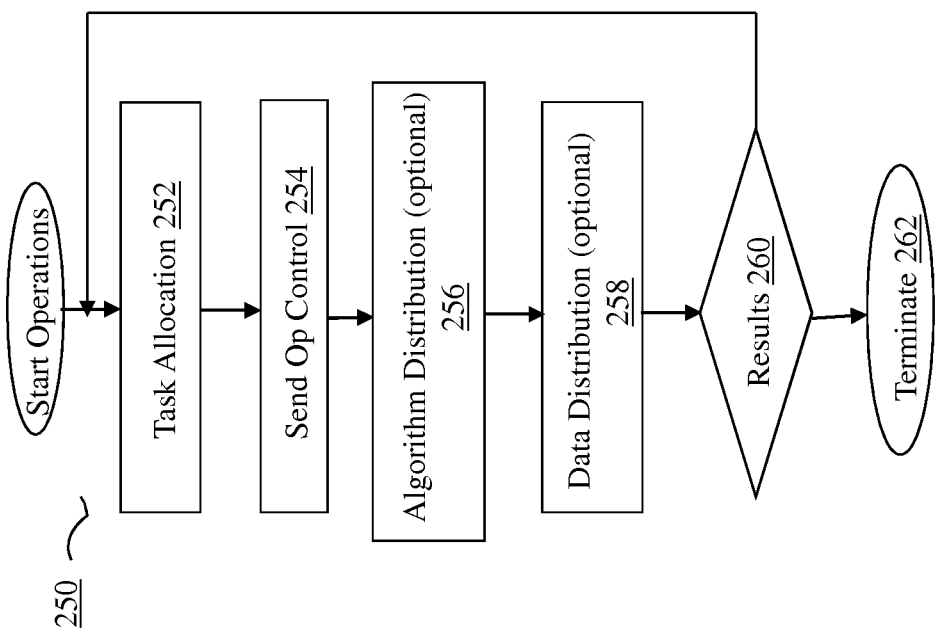
FIG. 13 shows a flowchart for sample basic operation of MCM.

Turning now to FIG. 13, a simple method for executing tasks in MCM is shown. It should be noted that while a simple embodiment of the method is shown to illustrate the working of MCM, many variations are possible.

FIG. 13 shows a method, MCM Operation 250. It comprises of a Task Allocation 252, a Send Operation Control 254, an optional Algorithm Distribution 256, an optional Data Distribution 258, a Results 260, and a Terminate 262.

After a Mobile Device 10 designated as the Master sets up an MCM Environment and is ready to start operations, it will begin to allocate tasks shown by Task Allocation 252. Task Allocation 252 will distribute the task to other MCM Environment members based on criteria defined by task allocation policies.

Following Task Allocation 252, Mobile Device 10 designated as the Master will send necessary control information shown as Send Op Control 254. Optionally, Mobile Device 10 designated as the Master may also send algorithms for execution shown as Algorithm Distribution 256 and data shown as Data Distribution 258.

In one embodiment, algorithms needed for executing tasks and/or data may be pre-loaded to the Mobile Devices 10. In this case, Algorithm Distribution 256 and Data Distribution 258 may not be required.

Following the execution of the task, results of the execution will be sent back to Mobile Device 10 designated as Master. Result may also be distributed to other Mobile Devices 10 in the cluster environment. This is shown as Result 260 in FIG. 13. Upon receiving the results, Mobile Device 10 designated as Master will evaluate the results. If the results are satisfactory, Master may end the MCM Setup with Terminate 262. Terminate 262 will initiate sequences for terminating active MCM environment. This will release all devices to participate in other MCM activities, if needed.

After a MCM environment is set up and it is active, MCM provides several mechanisms to monitor and maintain the integrity of the environment.

Figure 14:
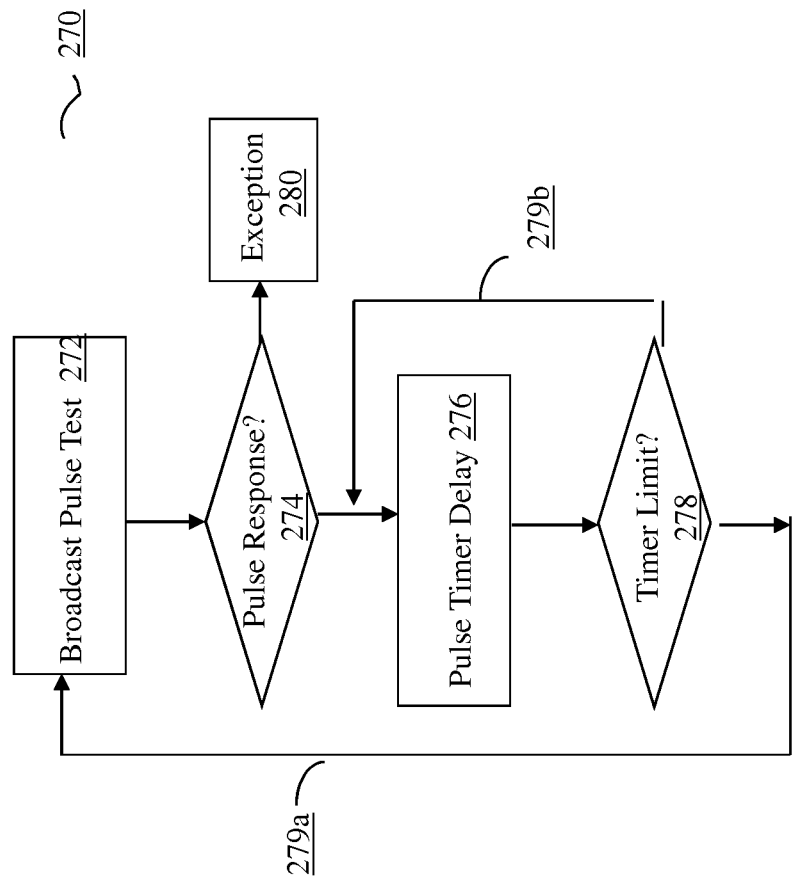
FIG. 14 shows a flowchart for sample maintenance operation of MCM for assuring the integrity of the cluster.

FIG. 14 shows a method, Pulse Check 270, that assures the availability of devices. FIG. 14 shows Pulse Check 270 comprising of a Broadcast Pulse Test 272, a Pulse Response check 274, a Pulse Timer Counter 276, a Pulse Timer Limit 278, and an Exception 280.

Mobile Device 10 designated as the Master of a MCM Environment 102 periodically initiates Broadcast Pulse Test 272. It then waits for responses from other member Mobile Devices 10 in the environment. If all members respond, Pulse Timer Delay 276 is initiated. When the Delay Limit 278 detects that it is time to initiate another pulse test, Broadcast Pulse Test 272 is invoked again shown as 279a.

If a member does not respond to a pulse test, Exception 280 is invoked. MCM allows various mechanisms to handle the exception of no response to a pulse test. In one embodiment, Master may re-send the pulse test to that slave device. In another embodiment, Master may remove non-responding Slaves from the environment and reassign the task to other members of the environment.

One of the key problems with mobile systems working in a cluster environment is the fact that Mobile Devices, by nature, are mobile. The topology and inter-connection between devices may change often. MCM provides several innovative mechanisms to handle this problem. Unlike fixed cluster and parallel processing schemes, MCM does not rely on specific configuration. Devices participating in an environment do not have to communicate with only neighbors. Neighbors can be changing and it will not have to communicate with fixed devices. They can communicate with any device within its communication range.

Turning now to FIG. 15, MCM Environment 102a of FIG. 3 is shown. Referring now to both FIG. 3 and FIG. 15, Mobile Device 10-4 has Mobile Devices 10-3 and Mobile Device 10-6 as its immediate neighbors in FIG. 3, while it has Mobile Device 10-3, Mobile Device 10-5, and Mobile Device 10-6 as its immediate neighbors in FIG. 15. Mobile Device 10-8 has Mobile Device 10-1, Mobile Device 10-3, Mobile Device 10-6, and Mobile Device 10-5 as its neighbors in FIG. 3, while it has Mobile Device 10-3 and Mobile Device 10-6 as its neighbors in FIG. 15.

As seen, the topology of MCM Environment 102a has changed from FIG. 3 to FIG. 15. However, this will not affect the operations of MCM. In FIG. 15, if Mobile Device 10-1 needs to communicate with Mobile Device 10-8, it will use Mobile Device 10-3 or Mobile Device 10-6 for indirect communication link.

Another issue arises from the possibility that moving devices may move in and out of the communication range of the devices in a cluster environment.

Turning to FIG. 16, an embodiment of MCM Environment 102a of FIG. 3 is shown. In addition to MCM Environment 102a, FIG. 16 comprise of events, a Leaving Cluster Range 103a and an Entering Cluster Range 103b.

In the figure, Mobile Device 10-5 is shown leaving the cluster communication range shown via Leaving Cluster Range 103a. MCM allows for several mechanisms to detect devices losing communication capability. In one embodiment, Pulse Check 270 will periodically monitor all devices. When it detects that a device has lost its communication capabilities, it will initiate Exception 280 that will handle the device missing case.

In another embodiment, Mobile Devices 10 in active MCM environment may be set up the send 'I am moving' signal when it moves beyond a certain set limit of distance.

In yet another embodiment, Mobile Devices 10 in active MCM environment may monitor its location by means of GPS or other methods. Using its location and/or co-ordinates, it may realize that it is moving out of communication range from other MCM environment device. Such a device may intimate other devices in the environment that it is leaving the communication range.

Once the departure of a Mobile Device 10 is realized, Master of the environment may reallocate the task to other devices in the environment.

Mobile Device 10 equipped with MCM and setup work in a given environment might enter an environment communication range. In FIG. 16, Mobile Device 10-10 is shown entering MCM Environment 102a via Entering Cluster Range 103b. Such a device may periodically broadcast to check if there is a MCM Environment active. If it finds an environment, such as MCM Environment 102a, it may volunteer to participate in the tasks. Master will then check to see the eligibility of the device and may include it in its task.

MCM allows Mobile Devices participating in an environment to temporarily excuse itself from the tasks of the MCM environment. In FIG. 16, Mobile Device 10-8 participating in MCM Environment 102a may declare itself 'Busy' to participate in MCM tasks. In one embodiment, this may be due to it having to dedicate its compute resource to local computation demand. In another embodiment, this may be due to it being short of resource like bandwidth. In another embodiment, it may be running low on its memory resources. In yet another embodiment, it may be running low on battery power. In yet another embodiment, it may have been preempted to participate in another MCM environment.

In FIG. 16, Mobile Device 10-8 is shown to be in 'Busy' state. Such a device may be preempted by Mobile Device 10 designated as Master for the MCM Environment 102a. If the Master feels that the task at hand is crucial and it needs the busy device to execute it, it may preempt the 'Busy' Mobile Device 10-8 to execute MCM tasks.

In one embodiment, Master may check why a device has gone 'Busy'. If it determines that MCM task is of critical nature, it may preempt the 'Busy' device unless the device is experiencing a potential failure condition.

As seen, there are various embodiments for leaving, entering, busy, and preempt states. The embodiments described are illustrative for demonstrating the flexibility of MCM.

MCM introduces an efficient and effective framework that enables mobile cluster computing.

In addition to enabling cluster capabilities for Mobile Devices, MCM also introduces several other benefits:
1) Enhanced compute power: With MCM Unit 100, MCM provides additional compute power to function alongside Mobile Device 10 to enhance the computation capability of the system.
2) Real-time resource management: MCM introduces mechanisms for Mobile Devices to detect and manage resources in the real-time.
3) Task sharing: MCM enables the ability for a Mobile Device to dispatch a task to other qualified Mobile Devices that are MCM enabled.
4) Executing dispatched tasks: An MCM enabled Mobile Device will be able to lend its compute power to other qualified devices.

In accordance with above disclosure, a mechanism to enable real-time, high compute power in the field is contemplated. The invention contemplates achieving this by clustering more than one Mobile Devices working in tandem. The invention contemplates mechanisms to set up a mobile cluster computing system. It further contemplates mechanisms to efficiently maintain a mobile cluster computing system. It also contemplates on sharing tasks between various devices.

While the above description contains many specificities, these should not be construed as limitations on the scope of the invention, but rather as an exemplification of preferred embodiments thereof. Accordingly, the scope of the invention should be determined not by the embodiment(s) illustrated, but by the appended claims and their legal equivalents.

The invention claimed is:

1. A method to enable clustering of a plurality of mobile compute devices that are in motion comprising:
   installing and configuring mobile clustering functionality to the plurality of mobile compute devices, enabling the plurality of mobile compute devices to participate in a mobile duster system;
   configuring a first of said plurality of configured mobile compute devices to be a master device;
   enabling said master device to detect one or more other compute devices among said plurality of configured compute devices;
   establishing a mobile duster environment comprising said master device and said one or more detected mobile compute devices;
   assigning each of the one or more detected mobile compute devices operating in said mobile duster environment as a slave device;
   sending a request for execution of a computational task to the master device in the mobile duster environment;
   broadcasting said request to the one or more slave devices in said mobile cluster environment by said master device;
   generating a response to said broadcast by said one or more slave devices;
   checking validity of said response by said master device; and
   in response to successful validation, enabling said mobile cluster environment to share the execution of said computational task;
   wherein said mobile cluster environment is terminated by dissolving the assignment of the one or more slave devices as a result of completion of said computational task.

2. The method of claim 1, wherein one of said slave devices is designated as a master device.

3. The method of claim 1, wherein said master device allocates tasks to said one or more slave devices, wherein said allocation includes control and operational data.

4. The method of claim 1, wherein said master device assures the integrity of said mobile cluster environment by periodically initiating a pulse test.

5. The method of claim 1, wherein a mobile compute device operating in said mobile cluster environment initiates a process to leave said mobile cluster environment.

6. The method of claim 1, wherein a mobile compute device operating in said mobile cluster environment is identified as busy and is temporarily suspended from said mobile cluster operation.

7. The method of claim 1, wherein a configured mobile compute device is added to said mobile cluster environment.

8. The method of claim 1, further comprising permitting a mobile cluster device to roam into the mobile cluster environment.

* * * * *